(12) United States Patent
O'Shaughnessy et al.

(10) Patent No.: US 11,045,049 B2
(45) Date of Patent: Jun. 29, 2021

(54) SECURING OF PANELS TO GRILL SYSTEM

(71) Applicant: OHC IP Holdings, LLC, Eden Prairie, MN (US)

(72) Inventors: Michael L. O'Shaughnessy, Edina, MN (US); James A. Mitlyng, Minneapolis, MN (US); Thomas E. Mckinney, Minnetonka, MN (US)

(73) Assignee: OHC IP Holdings, LLC, Eden Prairie, MN (US)

( * ) Notice: Subject to any disclaimer, the term of this patent is extended or adjusted under 35 U.S.C. 154(b) by 78 days.

(21) Appl. No.: 16/450,356

(22) Filed: Jun. 24, 2019

(65) Prior Publication Data

US 2020/0000278 A1 Jan. 2, 2020

Related U.S. Application Data

(60) Provisional application No. 62/690,700, filed on Jun. 27, 2018.

(51) Int. Cl.
*A47J 37/07* (2006.01)

(52) U.S. Cl.
CPC ....... *A47J 37/0713* (2013.01); *A47J 37/0786* (2013.01); *A47J 2037/0777* (2013.01)

(58) Field of Classification Search
CPC ...................... A47J 2037/0777; A47J 37/0786
See application file for complete search history.

(56) References Cited

U.S. PATENT DOCUMENTS

| | | | |
|---|---|---|---|
| 3,802,413 A | 4/1974 | Pepin | |
| 4,211,206 A | 7/1980 | Darbo | |
| 4,569,327 A | 2/1986 | Velten | |
| 4,577,772 A * | 3/1986 | Bigliardi | B65D 88/121 220/1.5 |
| 4,887,836 A | 12/1989 | Simjian | |
| 4,949,701 A | 8/1990 | Krosp et al. | |

(Continued)

FOREIGN PATENT DOCUMENTS

| | | |
|---|---|---|
| CN | 201005546 | 1/2008 |
| CN | 202801180 | 3/2013 |

(Continued)

OTHER PUBLICATIONS

"Char-Broil Modular Outdoor Kitchen," Char Broil webpage Apr. 29, 2019, retrieved on Aug. 8, 2019, https://www.charbroil.com/grills/outdoor-kitchens/modular-outdoor-kitchen (4 pages).

(Continued)

*Primary Examiner* — David J Laux
(74) *Attorney, Agent, or Firm* — Pauly, DeVries Smith & Deffner LLC

(57) ABSTRACT

In an embodiment, a grill system can include a grill assembly and a first side assembly. The grill assembly can include a grill cart and a burner box coupled to a top portion of the grill cart. The first side assembly can include a first side cart and a first panel. The first side cart is configured to be transitioned between a folded state and an upright state; wherein the grill assembly is coupled to the first side assembly. When the first panel is coupled to an outer side of the first side cart, the first side cart is locked into the upright state. Other embodiments are also included herein.

23 Claims, 19 Drawing Sheets

(56) References Cited

U.S. PATENT DOCUMENTS

| | | | |
|---|---|---|---|
| 4,984,515 A | 1/1991 | Pivonka | |
| 5,040,809 A | 8/1991 | Yang | |
| 5,050,731 A | 9/1991 | Baynes et al. | |
| 5,065,734 A | 11/1991 | Elliott | |
| 5,261,550 A | 11/1993 | Karpisek | |
| 5,318,322 A * | 6/1994 | Home | A47J 37/0713 126/9 R |
| 5,462,318 A | 10/1995 | Cooke | |
| 5,579,755 A * | 12/1996 | Johnston | A47J 37/0704 126/25 R |
| 5,884,554 A | 3/1999 | Sprick | |
| 6,026,751 A | 2/2000 | Tsai | |
| 6,039,039 A | 3/2000 | Pina, Jr. | |
| 6,316,837 B1 | 11/2001 | Song | |
| 6,401,953 B2 | 6/2002 | Kofod | |
| 6,439,111 B1 | 8/2002 | Lu | |
| 6,439,220 B1 | 8/2002 | Johnson | |
| 6,439,221 B1 | 8/2002 | Ward et al. | |
| 6,494,419 B2 | 12/2002 | Pai | |
| 6,532,951 B1 | 3/2003 | Sallie et al. | |
| 6,606,986 B2 | 8/2003 | Holland et al. | |
| 6,619,600 B1 * | 9/2003 | Johnson | A47J 37/0704 126/25 R |
| D485,467 S | 1/2004 | Pai Lucas | |
| D491,414 S | 6/2004 | Nichols et al. | |
| 6,792,880 B2 | 9/2004 | Tsai | |
| 6,823,858 B1 | 11/2004 | Chen | |
| 6,916,028 B1 | 7/2005 | Shapiro | |
| 7,080,640 B2 | 7/2006 | Sanders et al. | |
| D533,011 S | 12/2006 | Pai | |
| D541,576 S | 5/2007 | Lutz | |
| D546,616 S | 7/2007 | Tseng | |
| D546,624 S | 7/2007 | Pai | |
| D547,108 S | 7/2007 | Tseng | |
| D547,109 S | 7/2007 | Tseng | |
| D549,035 S | 8/2007 | Chung | |
| 7,360,783 B2 | 4/2008 | Home | |
| D615,799 S | 5/2010 | Best et al. | |
| D618,951 S | 7/2010 | Tzeng | |
| 7,753,047 B1 | 7/2010 | Trammell | |
| 7,856,924 B1 * | 12/2010 | Stihi | A47J 37/0731 99/419 |
| 8,042,829 B2 * | 10/2011 | Hailston | B62B 3/022 280/655.1 |
| 8,316,837 B2 | 11/2012 | Malumyan | |
| 8,347,874 B2 | 1/2013 | Bruno et al. | |
| 8,479,928 B2 | 7/2013 | Tanabe et al. | |
| 8,522,769 B2 * | 9/2013 | Ducate, Jr. | A47J 37/0786 126/25 R |
| 8,602,017 B2 * | 12/2013 | May | A47J 37/0704 126/9 R |
| RE44,770 E | 2/2014 | Nichols et al. | |
| 8,839,780 B1 * | 9/2014 | Bennett | G05B 19/41815 126/25 R |
| D737,096 S | 8/2015 | Lee Chad et al. | |
| 9,187,108 B2 | 11/2015 | Bruno et al. | |
| 9,211,036 B2 | 12/2015 | May et al. | |
| 9,316,401 B1 | 4/2016 | Guste | |
| 9,392,904 B2 * | 7/2016 | Garman | A47J 37/0763 |
| D798,645 S | 10/2017 | Lira-Nunez et al. | |
| 9,783,216 B2 * | 10/2017 | Alden | B62B 1/12 |
| 9,788,690 B2 * | 10/2017 | Rosian | A47J 37/0786 |
| 9,817,108 B2 | 11/2017 | Kuo et al. | |
| D805,332 S | 12/2017 | Price et al. | |
| D805,819 S | 12/2017 | Price et al. | |
| D820,010 S | 6/2018 | Reyes | |
| 10,689,018 B2 | 6/2020 | Patton et al. | |
| 10,702,099 B2 * | 7/2020 | O'Shaughnessy | A47J 37/0713 |
| 10,772,466 B2 * | 9/2020 | O'Shaughnessy | A47J 37/0786 |
| D899,176 S | 10/2020 | Lien | |
| 10,966,569 B2 | 4/2021 | O'Shaughnessy et al. | |
| 2001/0015137 A1 | 8/2001 | Ogrady et al. | |
| 2004/0020482 A1 | 2/2004 | Chen | |
| 2004/0065313 A1 | 4/2004 | Thompson | |
| 2006/0049725 A1 | 3/2006 | Simon | |
| 2006/0225725 A1 | 10/2006 | Rinaldo | |
| 2007/0089724 A1 * | 4/2007 | Home | A47J 37/0704 126/9 R |
| 2007/0152414 A1 | 7/2007 | Home | |
| 2008/0066730 A1 | 3/2008 | Ducate | |
| 2008/0245357 A1 * | 10/2008 | Meether | A47J 37/0786 126/25 R |
| 2010/0031950 A1 | 2/2010 | Paslawski | |
| 2010/0269814 A1 * | 10/2010 | May | A47J 37/0704 126/25 R |
| 2010/0326938 A1 * | 12/2010 | Zhu | A47F 5/10 211/149 |
| 2011/0025005 A1 | 2/2011 | Howell | |
| 2011/0041831 A1 | 2/2011 | Dettloff | |
| 2011/0168155 A1 | 7/2011 | Gallo | |
| 2011/0168168 A1 | 7/2011 | Schneider | |
| 2011/0168593 A1 | 7/2011 | Neufeld et al. | |
| 2012/0012091 A1 | 1/2012 | Home | |
| 2012/0017890 A1 | 1/2012 | May et al. | |
| 2013/0049311 A1 | 2/2013 | Metters et al. | |
| 2013/0112088 A1 | 5/2013 | May | |
| 2013/0312732 A1 * | 11/2013 | Brennan | A47J 37/0713 126/25 R |
| 2014/0069412 A1 | 3/2014 | Garman | |
| 2014/0090635 A1 | 4/2014 | May | |
| 2014/0165992 A1 | 6/2014 | May et al. | |
| 2014/0261394 A1 | 9/2014 | Evans et al. | |
| 2015/0013667 A1 | 1/2015 | Ho et al. | |
| 2015/0020796 A1 * | 1/2015 | Garman | A47J 37/0704 126/9 B |
| 2015/0118006 A1 | 4/2015 | Wallace-riley | |
| 2016/0305172 A1 | 10/2016 | Grisendi | |
| 2017/0085114 A1 | 3/2017 | Gao et al. | |
| 2017/0095114 A1 * | 4/2017 | O'Shaughnessy | A47J 37/0786 |
| 2017/0143162 A1 * | 5/2017 | Olsen | A47J 37/07 |
| 2017/0159941 A1 | 6/2017 | Kahler et al. | |
| 2018/0008095 A1 * | 1/2018 | Bennett | A47J 37/0786 |
| 2018/0132660 A1 * | 5/2018 | Suchevits | A23B 4/052 |
| 2018/0141576 A1 * | 5/2018 | Leffler | B62B 5/0063 |
| 2018/0280677 A1 | 10/2018 | Knight | |
| 2018/0290677 A1 | 10/2018 | Patton et al. | |
| 2018/0310765 A1 * | 11/2018 | May | A47J 37/0704 |
| 2019/0380533 A1 | 12/2019 | Lien | |
| 2020/0000277 A1 | 1/2020 | O'Shaughnessy et al. | |
| 2020/0000279 A1 * | 1/2020 | O'Shaughnessy | A47J 37/0713 |
| 2020/0000280 A1 | 1/2020 | O'Shaughnessy et al. | |
| 2020/0000281 A1 | 1/2020 | O'Shaughnessy et al. | |
| 2020/0000283 A1 | 1/2020 | O'Shaughnessy et al. | |
| 2020/0390279 A1 | 12/2020 | O'Shaughnessy et al. | |
| 2020/0391779 A1 | 12/2020 | Patton et al. | |
| 2021/0045579 A1 | 2/2021 | O'Shaughnessy et al. | |

FOREIGN PATENT DOCUMENTS

| | | |
|---|---|---|
| CN | 202807780 | 3/2013 |
| CN | 104234616 | 12/2014 |
| CN | 204618011 | 9/2015 |
| CN | 205632566 | 10/2016 |
| CN | 107198467 | 9/2017 |
| JP | 2006223643 | 8/2006 |
| KR | 200173343 | 4/2000 |
| KR | 20050102437 | 10/2005 |
| KR | 20130000879 | 2/2013 |
| TW | 309958 | 7/1997 |
| WO | 2004054415 | 7/2004 |
| WO | 2004072539 | 8/2004 |
| WO | 2015089551 | 6/2015 |
| WO | 2016149408 | 11/2016 |
| WO | 2017095746 | 6/2017 |
| WO | 2017160338 | 9/2017 |
| WO | 2018183373 | 10/2018 |
| WO | 2020005946 | 1/2020 |
| WO | 2020005969 | 1/2020 |
| WO | 2020005972 | 1/2020 |
| WO | 2020005976 | 1/2020 |

(56) References Cited

FOREIGN PATENT DOCUMENTS

| | | |
|---|---|---|
| WO | 2020005978 | 1/2020 |
| WO | 2020005981 | 1/2020 |

OTHER PUBLICATIONS

"Danver's Post and Panel System," Danver webpage Jun. 1, 2018, retrieved on Aug. 8, 2019, https://danver.com/blog/post-and-panel-system/ (2 pages).
"Final Office Action," for U.S. Appl. No. 15/262,733 dated Sep. 5, 2019 (14 pages).
"International Preliminary Report on Patentability," for PCT Application No. PCT/US2018/024628 dated Oct. 10, 2019 (13 pages).
"International Search Report and Written Opinion," for PCT Application No. PCT/US2019/038993 dated Oct. 15, 2019 (13 pages).
"International Search Report and Written Opinion," for PCT Application No. PCT/US2019/039024 dated Oct. 15, 2019 (14 pages).
"International Search Report and Written Opinion," for PCT Application No. PCT/US2019/039027 dated Oct. 15, 2019 (13 pages).
"International Search Report and Written Opinion," for PCT Application No. PCT/US2019/039034 dated Oct. 15, 2019 (12 pages).
"International Search Report and Written Opinion," for PCT Application No. PCT/US2019/039039 dated Oct. 16, 2019 (14 pages).
"International Search Report and Written Opinion," for PCT Application No. PCT/US2019/039042 dated Oct. 16, 2019 (13 pages).
"Non-Final Office Action," for U.S. Appl. No. 16/450,303 dated Oct. 24, 2019 (19 pages).
"Non-Final Office Action," for U.S. Appl. No. 16/450,541 dated Oct. 1, 2019 (21 pages).
"Origami Carts and Racks," Origami webpage Apr. 20, 2016, retrieved on Dec. 9, 2019 via web.archive.org, https://origamirack.com (12 pages).
"Response to Final Office Action," for U.S. Appl. No. 15/262,733, filed Dec. 5, 2019 (11 pages).
"Second Office Action," for Chinese Patent Application No. 201610876505.3 dated Aug. 29, 2019 (4 pages) with English Translation.
"Sunco Outdoor Kitchen," Mar. 16, 2018 URL <https://www.sunco.com.au/shop/bbqs/sc100-xspec-four-burner-outdoor-kitchen/> (3 pages).
"Traeger Wood Pellet Grills," Traeger Grills webpage Apr. 7, 2006, retrieved on Dec. 9, 2019 via web.archive.org, https://www.traegergrills.com (2 pages).
"Final Office Action," for U.S. Appl. No. 16/450,541 dated Feb. 5, 2020 (19 pages).
"Non-Final Office Action," for U.S. Appl. No. 15/262,733 dated Jan. 8, 2020 (18 pages).
"Notice of Allowance," for U.S. Appl. No. 15/937,666 dated Feb. 18, 2020 (14 pages).
"Notice of Allowance," for U.S. Appl. No. 16/450,303 dated Feb. 14, 2020 (13 pages).
"Notice of Allowance," for U.S. Appl. No. 16/450,541 dated May 14, 2020 (12 pages).
"Response to Final Office Action," for U.S. Appl. No. 16/450,541, filed May 5, 2020 (7 pages).
"Response to Non Final Office Action," for U.S. Appl. No. 16/450,541, filed Dec. 30, 2019 (16 pages).
"Third Office Action," for Chinese Patent Application No. 201610876505.3 dated Mar. 19, 2020 (8 pages) with English Translation.
"Brown Jordan Outdoor Kitchens," by Danver Stainless Outdoor Kitchens information booklet, Apr. 2018 (28 pages).
Colon, Linda M. "Danver's Post and Panel System is a Hit with Architects, Builders, Developers & Designers," Danver Outdoor Kitchens Jun. 1, 2018 (2 pages).
File History for U.S. Appl. No. 15/262,733 downloaded Aug. 23, 2019 (326 pages).
File History for U.S. Appl. No. 15/937,666 downloaded Aug. 23, 2019 (201 pages).
"First Office Action," for Chinese Patent Application No. 20110876505.3 dated Dec. 18, 2018 (14 pages) with English Translation.
"International Preliminary Report on Patentability," for PCT Application No. PCT/US2016/051319 dated Sep. 27, 2018 (11 pages).
"International Search Report and Written Opinion," for PCT Application No. PCT/US2016/051319 dated Dec. 8, 2016 (14 pages).
"International Search Report and Written Opinion," for PCT Application No. PCT/US2018/024628 dated Jul. 11, 2018 (16 pages).
"Modular Outdoor Kitchen," Char-Broil Medallion Series Outdoor Kitchen information retrieved from https://www.charbroil.com/grills/modular-outdoor-kitchen on Aug. 8, 2019 (4 pages).
"Origami Kitchen Island Cart with Wheels," Description and Product Specs at least as early as Aug. 9, 2019 (5 pages).
"Traeger Wood Pellet Grills," Product Listing found on www.traegergrills.com at least as early as Aug. 9, 2019 (4 pages).
"International Preliminary Report on Patentability," for PCT Application No. PCT/US2019/038993 dated Jan. 7, 2021 (9 pages).
"International Preliminary Report on Patentability," for PCT Application No. PCT/US2019/039024 dated Jan. 7, 2021 (10 pages).
"International Preliminary Report on Patentability," for PCT Application No. PCT/US2019/039027 dated Jan. 7, 2021 (9 pages).
"International Preliminary Report on Patentability," for PCT Application No. PCT/US2019/039034 dated Jan. 7, 2021 (8 pages).
"International Preliminary Report on Patentability," for PCT Application No. PCT/US2019/039039 dated Jan. 7, 2021 (10 pages).
"International Preliminary Report on Patentability," for PCT Application No. PCT/US2019/039042 dated Jan. 7, 2021 (9 pages).
"Notice of Allowance," for U.S. Appl. No. 16/450,493 dated Feb. 12, 2021 (21 pages).
"Response after Ex Parte Quayle Action," for U.S. Appl. No. 29/695,966, filed Feb. 9, 2021 (4 pages).
"Response after Ex Parte Quayle Action," for U.S. Appl. No. 29/695,973, filed Feb. 9, 2021 (4 pages).
"Response after Ex Parte Quayle Action," for U.S. Appl. No. 29/695,976, filed Feb. 9, 2021 (4 pages).
"Response to Non Final Office Action," for U.S. Appl. No. 16/450,493, filed Feb. 2, 2021 (11 pages).
"Ex Parte Quayle Action," for U.S. Appl. No. 29/695,966, dated Dec. 11, 2020 (23 pages).
"Ex Parte Quayle Action," for U.S. Appl. No. 29/695,973 dated Dec. 11, 2020 (23 pages).
"Ex Parte Quayle Action," for U.S. Appl. No. 29/695,976 dated Dec. 11, 2020 (24 pages).
"Fourth Office Action," for Chinese Patent Application No. 201610876505.3 dated Sep. 30, 2020 (11 pages) with English Summary.
Morgan, Grant "Nationwide Marketing Group Announces Its Partnership with TYTUS Grills," first available online Oct. 9, 2019, TytusGrills.com, [online], [site visited Nov. 27, 2020], available from internet URL: https://www.twice.com/retailing/nationwide-marketing-group-announces-its-partnership-with-tytus-grills (year: 2019).
"Non-Final Office Action," for U.S. Appl. No. 16/450,493 dated Nov. 2, 2020 (26 pages).
"Non-Final Office Action," for U.S. Appl. No. 16/450,510 dated Dec. 14, 2020 (32 pages).
"Notice of Allowance," for U.S. Appl. No. 16/450,388 dated Dec. 1, 2020 (27 pages).
"TYTUS Charcoal Grey Stainless Steel 4 Burner Free Standing Grill," first available 2020, TytusGrills.com, [online], [site visited Nov. 27, 2020], Available from internet URL: https://tytusgrills.com/collections/grills/products/tytus-charcoal-grey-stainless-steel-4-burner-free-standing-grill (Year: 2020), 5 pages.
"TYTUS Grills," first available 2020, TytusGrills.com, [online], [site visited Dec. 1, 2020], Available from internet URL: https://tytusgrills.com/collections/grills (Year: 2020), 3 pages.
"TYTUS TI404MGGLP Spec Sheet," first available 2020, AppliancesConnection.com, [online], [site visited Nov. 27, 2020], Available from internet URL: https://static.appliancesconnection.com/attachments/D5f524932e12f6.pdf (Year: 2020), 2 pages.
"TYTUS TI400MWLP Spec Sheet," first available 2020, SamsClub.com, [online], [site visited Nov. 27, 2020], Available from internet

(56) References Cited

OTHER PUBLICATIONS

URL: https://content.syndigo.com/asset/9f341 0f8-d6c3-48c1-a02c-f5bdbb9f989b/original.pdf (Year: 2020), 2 pages.

"TYTUS T1400SSBLP341 Spec Sheet," first available 2020, AppliancesConnection.com, [online], [site visited Nov. 27, 2020], Available from internet URL: https://static.appliancesconnection.com/attachments/D5f524e4ae6c38.pdf (Year: 2020), 2 pages.

"TYTUS User Manual 4-Burner Gas Grill and 4-Burner Island Gas Grill with Side Cabinets," first available 2020, TytusGrills.com, [online], [site visited Dec. 1, 2020], Available from internet URL: https://tytusgrills.com/pages/manualsanddocuments (Year: 2020), 60 pages).

"Notice of Allowance," for U.S. Appl. No. 29/695,969 dated Mar. 24, 2021 (18 pages).

"Notice of Allowance," for U.S. Appl. No. 29/695,976 dated Mar. 8, 2021 (16 pages).

"Notice of Allowance," for U.S. Appl. No. 16/450,510 dated Mar. 22, 2021 (18 pages).

"Notice of Allowance," for U.S. Appl. No. 29/695,966 dated Mar. 1, 2021 (14 pages).

"Notice of Allowance," for U.S. Appl. No. 29/695,973 dated Mar. 3, 2021 (16 pages).

"Response to Non Final Office Action," for U.S. Appl. No. 16/450,510 dated Mar. 12, 2021 (11 pages).

\* cited by examiner

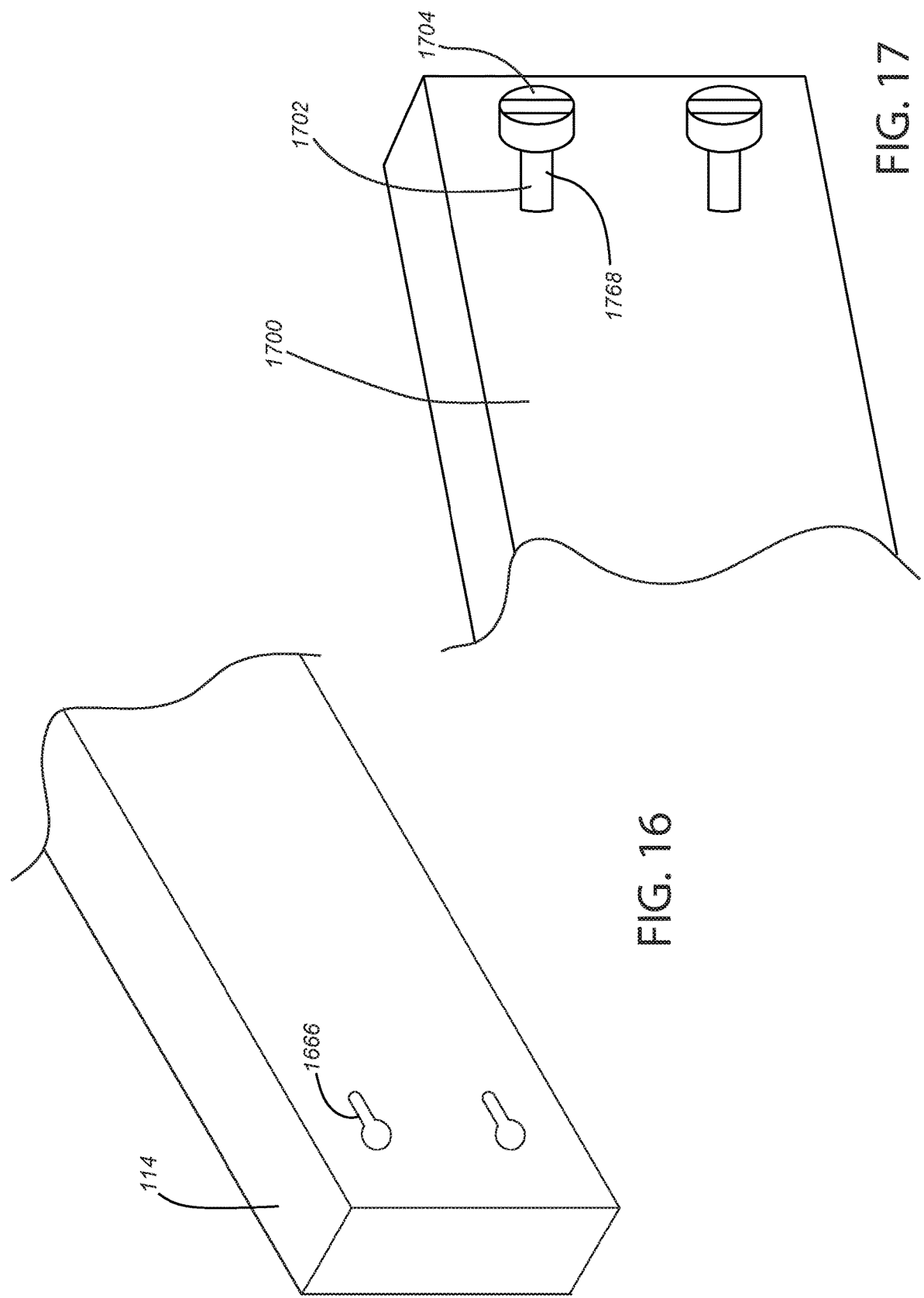

SECURING OF PANELS TO GRILL SYSTEM

CLAIM OF PRIORITY

This application claims the benefit of U.S. Provisional Application No. 62/690,700, filed Jun. 27, 2018, the content of which is herein incorporated by reference in its entirety.

REFERENCE TO RELATED APPLICATIONS

The following five nonprovisional applications also claim priority to U.S. Provisional Application No. 62/690,700, are co-owned, and are filed on the event date herewith: U.S. application Ser. No. 16/450,303, titled, "Grill and Side Cart Attachment Systems and Methods," U.S. application Ser. No. 16/450,388, titled, "Grill System with Decorative Panels," U.S. application Ser. No. 16/450,493, titled, "Gas Guard in Grill Cart," U.S. application Ser. No. 16/450,510, titled, "Side Cart Locking Mechanism," and U.S. application Ser. No. 16/450,541, titled, "Grill Assembly with Foldable Cart," the contents of which for each application are herein incorporated by reference in their entirety. The following four design applications are co-owned and are filed on the event date herewith: U.S. Design application Ser. No. 29/695,966, titled, "Grill System," U.S. Design application Ser. No. 29/695,969, titled, "Grill Assembly," U.S. Design application Ser. No. 29/695,973, titled, "Grill Cart," U.S. Design application Ser. No. 29/695,976, titled, "Side Assembly," the contents of which for each application are herein incorporated by reference in their entirety.

FIELD

The present application relates to grills and outdoor cooking systems. More specifically, the present application relates to modular grills and outdoor cooking systems.

BACKGROUND

Grilling is a cooking style that is especially popular in the United States. Grills are frequently not particularly portable or easy to set up. In many cases, grills are difficult to assemble due to numerous steps requiring the user to construct a frame with numerous components.

Attempts have been made to design grills that are easy to assemble after unloading from shipping containers. However, in many past systems, grill systems include a large number of pieces, require numerous steps to assemble, and some assembly steps require tools.

Some past systems mount a firebox on a foldable stand. However, the foldable stands can require complex set-up steps and, even in the folded configuration, some of the foldable stands take-up significant space.

Permanent outdoor grill installations are increasingly popular, and allow consumers to choose many finishes and options to create an attractive and functional outdoor kitchen environment. These installations are very expensive, and lack the flexibility of a moveable grill system.

SUMMARY

In an embodiment, a grill system is provided. The grill system can include a grill assembly and a first side assembly. The grill assembly can include a grill cart and a burner box coupled to a top portion of the grill cart. The first side assembly can include a first side cart and a first panel. The first side cart is configured to be transitioned between a folded state and an upright state. The grill assembly is coupled to the first side assembly. When the first panel is coupled to an outer side of the first side cart, the first side cart is locked into the upright state.

In an embodiment, the first side cart includes: a front frame; a back frame opposite from the front frame; and a first shelf extending from the front frame to the back frame; wherein the first shelf includes a front half and a back half, the front half rotatably coupled to the back half and rotatably coupled to the front frame, and the back half rotatably coupled to the back frame, such that when the first side cart is in the folded state the front half and the back half are not located in the same plane and when the first side cart is in the upright state the front half and the back half are in the same plane.

In an embodiment, in the folded state, the front half is substantially parallel with the back half, the front frame and the back frame.

In an embodiment, in the upright state, the front half is substantially parallel with the back half, and the first shelf is substantially perpendicular to the front frame and the back frame.

In an embodiment, the first side cart further includes a second shelf extending from the front frame to the back frame; wherein the second shelf includes a front half and a back half, the front half rotatably coupled to the back half and rotatably coupled to the front frame, and the back half rotatably coupled to the back frame, such that when the first side cart is in the folded state the front half and the back half are not located in the same plane and when the first side cart is in the upright state the front half and the back half are in the same plane.

In an embodiment, in the locked upright state, the first panel prevents the back frame of the first side cart from being able to be moved closer to the front frame of the first side cart.

In an embodiment, in the locked upright state, the first panel is disposed between a portion of the front frame and a portion of the back frame.

In an embodiment, in the locked upright state, the first panel contacts a portion of the front frame and a portion of the back frame.

In an embodiment, the grill system can include a second panel. The second panel is coupled to the grill cart on an opposite side of the grill cart from the first side assembly.

In an embodiment, the grill system can include a second side assembly. The second side assembly can include a second side cart and a second panel. The second side cart is configured to be transitioned between a folded state and an upright state. The second side assembly is coupled to the grill assembly on an opposite side of the grill assembly from the first side assembly. When the second panel is coupled to an outer side of the second side cart, opposite from the grill assembly, the second side cart is locked in the upright state.

In an embodiment, the grill system can include a toe kick panel coupled to the front frame of the first side cart. The toe kick panel is substantially perpendicular to the first panel when the first panel is coupled to the outer side of the first side cart. The toe kick panel includes a first design and the first panel include the first design.

In an embodiment, the first side cart includes a panel connection projection and the first panel defines a panel connection aperture configured for a portion of the panel connection projection to extend within.

In an embodiment, the first panel and the first side cart are coupled together with a latch.

In an embodiment, a method of assembling a grill system is provided. The method can include aligning a burner box with a top portion of a grill cart; coupling the burner box to the grill cart to form a grill assembly; transitioning a first side cart from a folded state to an upright state; locking the first side cart in the upright state thereby forming a first side assembly; aligning the first side assembly with the grill assembly; and coupling the first side assembly to the grill assembly.

In an embodiment, the first side cart is locked in the upright state by coupling a first panel to the first side cart.

In an embodiment, the method can include: coupling a second panel to the grill cart; wherein the second panel is coupled to a side of the grill cart that is opposite from the first side assembly.

In an embodiment, the method can include: aligning a first top cap with the first side cart; and coupling the first top cap with the first side cart; wherein the first top cap includes a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator.

In an embodiment, the method can include: transitioning a second side cart from a folded state to an upright state; locking the second side cart in the upright state thereby forming a second side assembly; aligning the second side assembly with the grill assembly on the opposite side from the first side assembly; and coupling the second side assembly to the grill assembly.

In an embodiment, the second side cart is locked in the upright state by coupling a second panel to the second side cart.

In an embodiment, the method can include: aligning a first top cap with the first side cart; coupling the first top cap with the first side cart; aligning a second top cap with the second side cart; and coupling the second top cap with the second side cart; wherein the first top cap includes a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator; wherein the second top cap includes a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator.

In an embodiment, the functional element of the first top cap is not equivalent to the functional element of the second top cap.

In an embodiment, a grill system is provided. The grill system can include a grill assembly and a first side assembly. The grill assembly can include a grill cart and a burner box coupled to a top portion of the grill cart. The first side assembly can include a first side cart, a first top cap, and a first panel. The first top cap is coupled to a top portion of the first side cart. The first side cart is configured to be transitioned between a folded state and an upright state. The grill assembly is coupled to the first side assembly. When the first panel is coupled to an outer side of the first side cart, the first side cart is locked in the upright state. The first top cap includes a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator.

In an embodiment, grill system can include: a second side assembly can include a second side cart, a second top cap, and a second panel; wherein the second top cap is coupled to a top portion of the second side cart, wherein the second side cart is configured to be transitioned between a folded state and an upright state; wherein the second side assembly is coupled to the grill assembly; wherein when the second panel is coupled to an outer side of the second side cart the second side cart is locked in the upright state; wherein the second top cap includes a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator; wherein the functional element of the first top cap is not equivalent to the functional element of the second top cap.

In an embodiment, a grill assembly is included having a grill cart configured to be transitioned between a folded state and an upright state; a burner box; and a panel. The burner box is coupled to a top portion of the grill cart; wherein when the panel is coupled to an outer side of the grill cart the grill cart is locked into the upright state.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 16 is a perspective view of a toe kick panel end portion in accordance with various embodiments herein.

FIG. 17 is a perspective view of a toe kick panel connection element in accordance with various embodiments herein.

Figure 1:
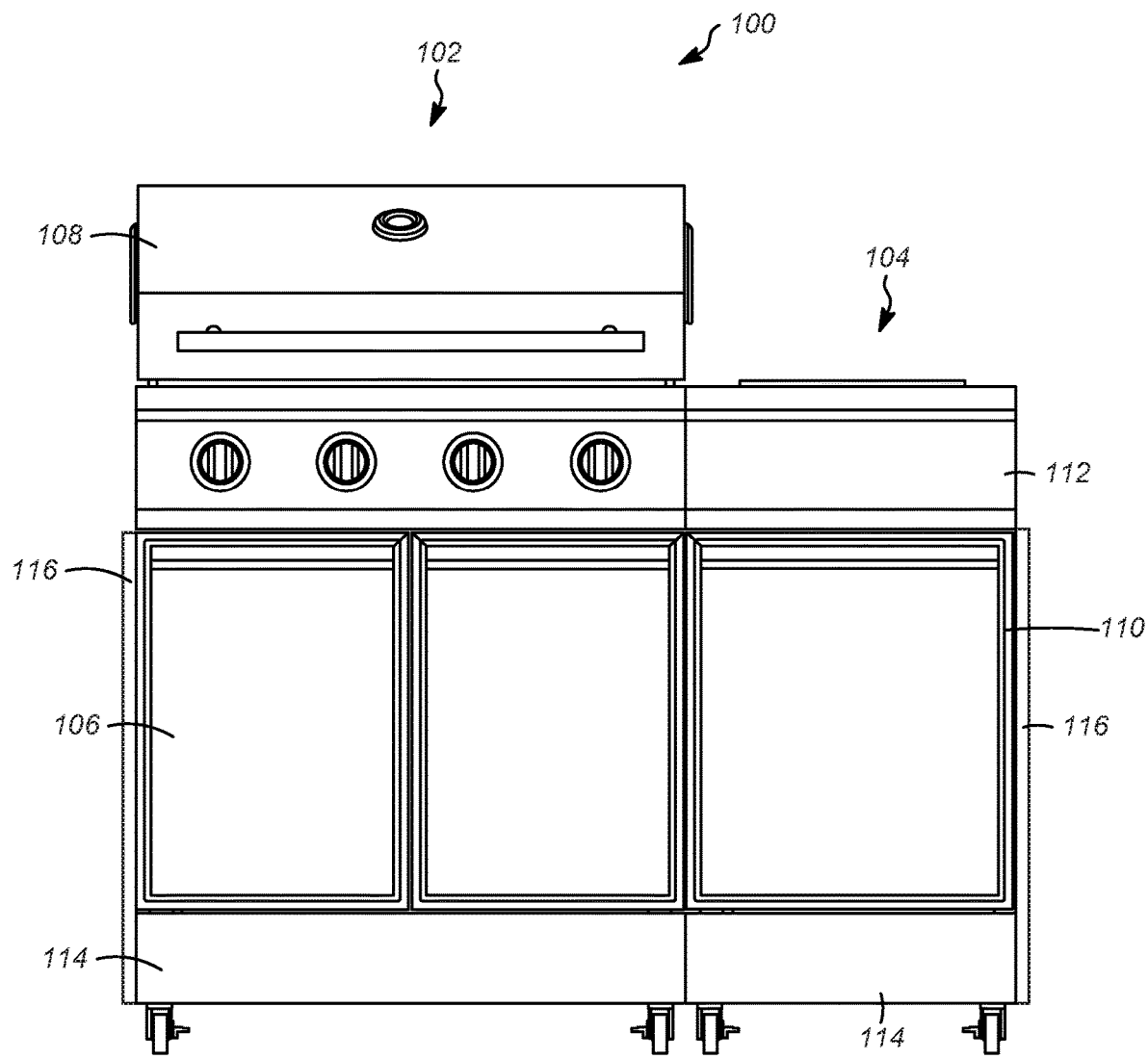
FIG. 1 is a front view of a grill system in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Described below and shown in the figures are various embodiments of components that can be included in a grill system. In many examples, the grill systems described herein can provide a highly customizable, an easily assembled, and an easily installed outdoor kitchen environment.

The grill system can include a grill assembly and one or more side assemblies. The grill assembly can include a burner box, which can be used to cook foods, such as meats and vegetables. Each side assembly can include a functional top cap to provide additional functionality to the grill system. The grill system can further include one or more panels. The panels can be attached to the side cart(s) and/or the grill cart. In some embodiments, the panels can be decorative panels. The decorative panels can provide a consistent appearance to the grill system across the various components.

The grill and side assemblies can be shipped or transported in a folded configuration. In the folded configuration, the grill and side assemblies can have a smaller volume compared to the upright configurations. The smaller volume can reduce the cost of storing and transporting the components. In various embodiments, installing a panel on a side cart or a grill cart can lock the cart into the upright configuration. In some embodiments, installing a panel on a side cart or a grill cart can provide a secondary lock, such as to lock the cart independently of a primary lock and/or to prevent a primary lock from unlocking.

The grill and side assemblies described herein can be easily assembled. In many cases, the grill and side assemblies can be assembled by a single user or only two users. In many examples, the grill and side assemblies can be assembled without the use of tools. In many examples, the grill and side assemblies can be assembled quickly, such as in less than three minutes for each component.

The systems can include decorative side panels and/or decorative toe kick panels to provide a cohesive look to all of the components within the system. In some examples, decorative side and toe kick panels can be configured to attach at various different locations within the system, such that the same decorative side panel and toe kick panel can be used with multiple configurations of the system. A cohesive look can be offered to consumers with smaller numbers of elements in inventory because the decorative side panels and decorative toe kick panels can attached to either the side assemblies or the grill assemblies or both.

Grill System with Grill Assembly and Side Assemblies

The figures show various views and embodiments of grill systems and components. FIG. 1 shows a grill system 100 including a grill assembly 102 and a side assembly 104. The grill assembly 102 can include a grill cart 106 and a burner box 108 (also referred to as a "firebox") coupled to a top portion of the grill cart 106. The side assembly 104 can include a side cart 110 and a top cap 112. The top cap 112 can be coupled to a top portion of the side cart 110.

Figure 9:
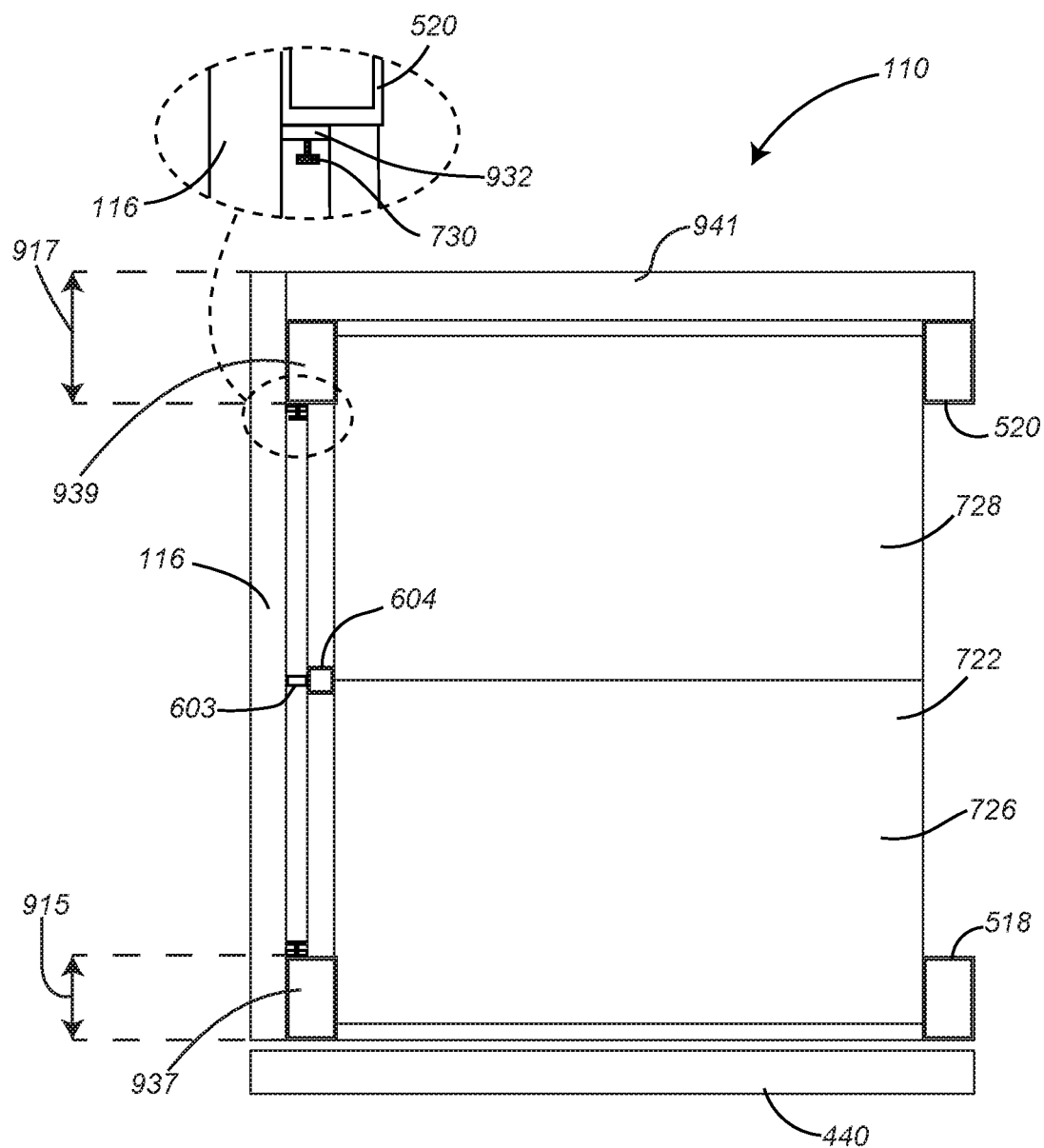
FIG. 9 is a top view of a side cart in accordance with various embodiments herein.

The grill system 100 can further include one or more panels 116. In the front view shown in FIG. 1 the side panels 116 are shown schematically so that their location with respect to other parts in the system is visible from the front view. However, in some embodiments, the side panels 116 would not be seen from the front view, such as when the side panels 116 are coupled to side carts as shown in FIG. 9.

The side panels 116 can be decorative panels. In various embodiments, the side panels 116 and the toe kick panel 114 can include the same pattern or appearance on an outer surface, such as to provide a cohesive appearance to the grill system 100. In some embodiments, a toe kick panel 114 can be coupled to the front of each of the side carts 110 and to the front of the grill cart 106. In some embodiments, the toe kick panel 114 coupled to the front of the side cart 110 or the grill cart 106 can be substantially perpendicular to the decorative panel 116 when the decorative panel 116 is coupled to the side cart 110 or the grill cart 106. In various embodiments, "substantially perpendicular" can refer to two components that are within 15 degrees of perpendicular, within 10 degrees of perpendicular, within 5 degrees of perpendicular, within 3 degrees of perpendicular, within 1 degree of perpendicular, or are perpendicular.

Figure 2:
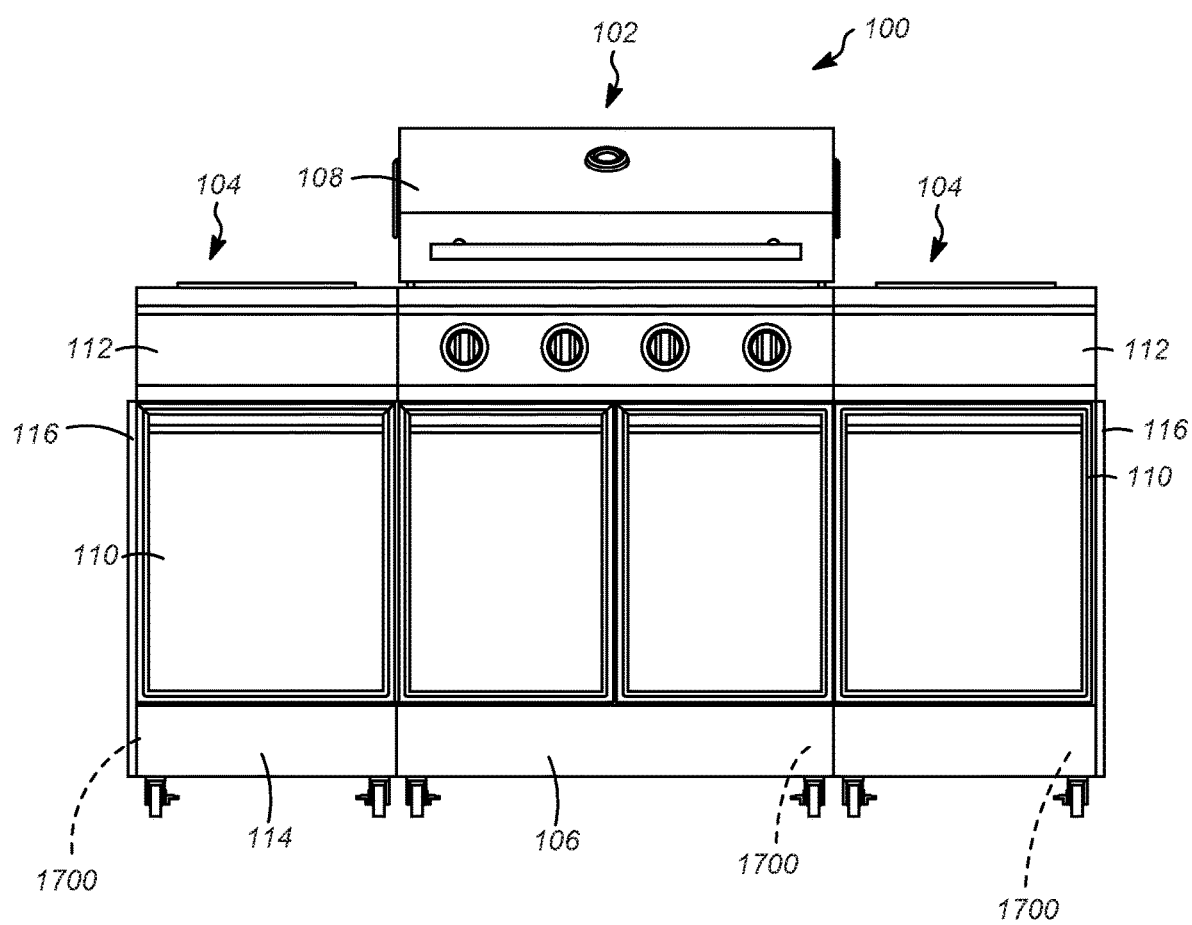
FIG. 2 is a front view of a grill system in accordance with various embodiments herein.

In some embodiments, a side panel 116 can be coupled to the outer side of the side cart 110 and a second side panel 116 can be coupled to the outer side of the grill cart 106, such as shown in FIG. 1. A side panel 116 can be coupled to the opposite side of the grill cart 106 from the side cart 110. In other embodiments, a side panel 116 can be coupled to an outer side of a first side cart 110, and a second side panel 116 can be coupled to an outer side of a second side cart 110, such as shown in FIG. 2. In various embodiments, the side carts 110 and grill cart 106 can have the same connection mechanisms for connecting a side panel 116, such as to allow a side panel 116 to be coupled to either a side cart 110 or a grill cart 106. Consistent connection mechanisms can also allow for flexibility in rearranging the grill system 100. For example, a user can change from the system in FIG. 1 to the system in FIG. 2 by adding a second side cart 110 and moving a decorative side panel 116 from the side of the grill cart to the side of the side cart. In another example, a user can change from the system in FIG. 2 to the system of FIG. 3 by moving a side cart 110 from one side to another and moving the side panels 116 to be present on the outer side surfaces of the rearranged system.

In some embodiments, the grill cart 106 and the side cart 110 can be configured to transition between a folded state and an upright state. In various embodiments, a panel 116 being coupled to or installed on the grill cart 106 or the side cart 110 in an upright state can lock the grill cart 106 or side cart 110 in the upright state, such that it cannot be transitioned to the folded state without first removing the side panel 116.

Figure 3:
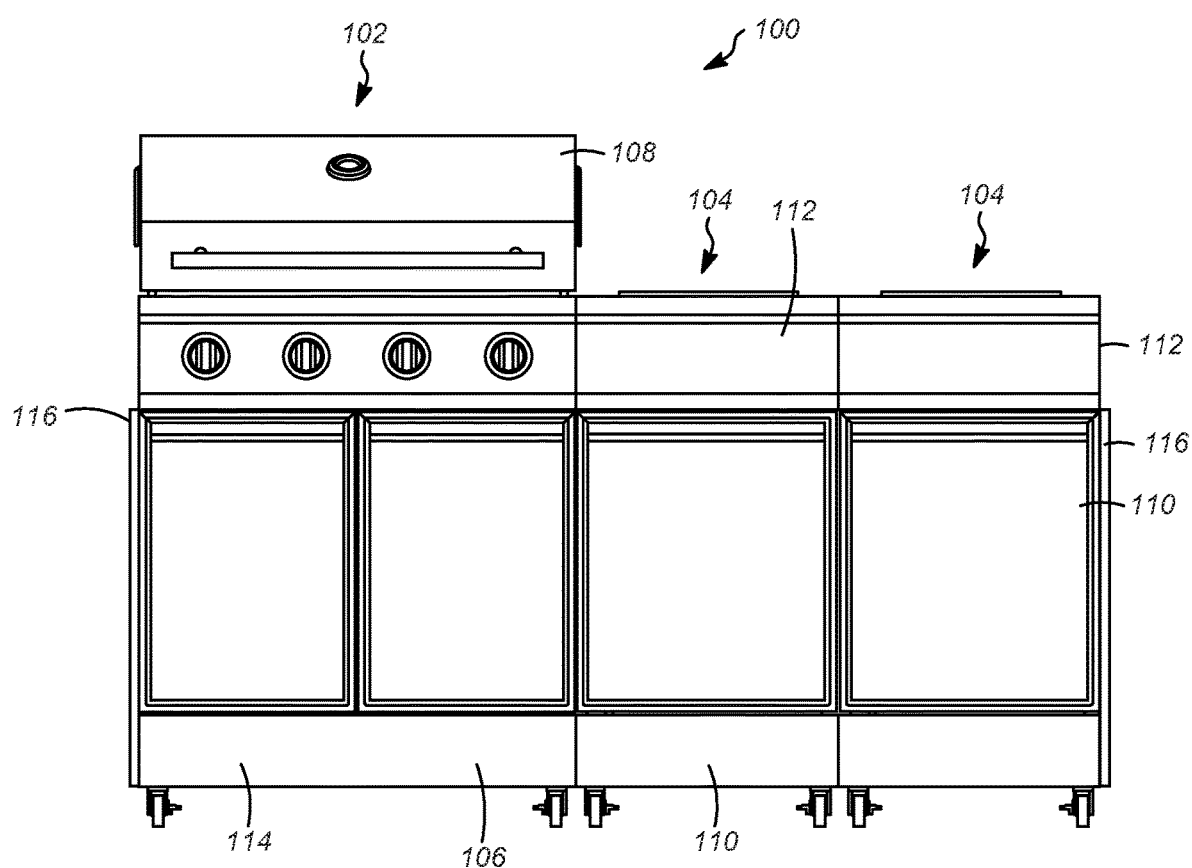
FIG. 3 is a front view of a grill system in accordance with various embodiments herein.

FIG. 2 shows a front view of a grill system 100 in accordance with various embodiments herein. In some embodiments, the grill system 100 can include a grill assembly 102, and two or more side assemblies 104. Each of the side assemblies 104 can include a side cart 110 and a top cap 112. In some embodiments, the side assemblies 104 can be disposed on opposite sides of the grill assembly 102, such as shown in FIG. 2. In some embodiments, the side assemblies 104 can be disposed on the same side of the grill assembly 102, such as shown in FIG. 3. In other embodiments, the grill system 100 can include additional side assemblies 104, such as three, four, five, six, or more side assemblies 104.

In some embodiments, all of the side assemblies 104 can be located on one side of the grill assembly 102, such as shown in FIG. 3. In some embodiments, side assemblies 104 can be located on both sides of the grill assembly 102, such as shown in FIG. 2. In some embodiments, an equal number of side assemblies 104 can be located on either side of the grill assembly 102. In some embodiments, the number of side assemblies 104 on one side of the grill assembly 102 can be greater than or less than the number of side assemblies 104 on the other side of the grill assembly 102.

In some embodiments, the grill assembly 102 is coupled to two side assemblies 104, such as one side assembly 104 on either side of the grill assembly 102. The grill system 100 can include two side panels 116, such as one side panel 116 coupled to the outer side of each of the two side carts 110. A first side of each of the side carts 110 can be coupled to opposite sides of the grill cart 106 and a panel 116 can be coupled to a second side of each of the side carts 110.

In various embodiments, the grill assembly 102 can be coupled to a side assembly 104 such that a side of the grill assembly 102 is adjacent to a side of the side assembly 104, and the front side of the grill cart 106 faces in the same direction as the front side of the side cart 110. The grill assembly 102 can be further coupled to a second side assembly 104 such that a second side of the grill assembly 102 is adjacent to a side of the second side assembly 104, and the front side of the grill cart 106 faces in the same direction as the front side of the second side cart 110. A side panel 116 can be coupled to the outer side of each of the side carts 110, such as shown in FIG. 2.

As shown in FIG. 3, in various embodiments, the grill assembly 102 can be coupled to a side assembly 104 such that a side of the grill assembly 102 is adjacent to a side of the side assembly 104, and the front side of the grill cart 106 faces in the same direction as the front side of the side cart 110. The side assembly 104 can be further coupled to a second side assembly 104 such that a second side of the first side assembly 104 is adjacent to a side of the second side assembly 104, and the front side of the grill cart 106 and front sides of the side carts 110 face in the same direction. A side panel 116 can be coupled to the outer side of the second side cart 110 and the outer side of the grill cart 106.

Side Assembly

Figure 4:
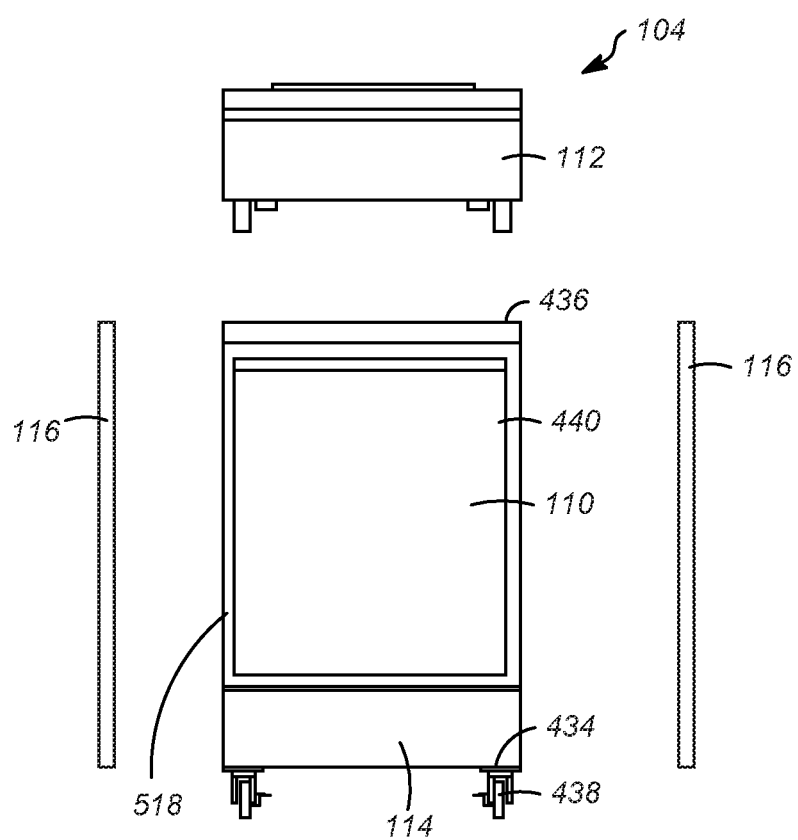
FIG. 4 is a front exploded view of a side assembly in accordance with various embodiments herein.

FIG. 4 shows a front view of a top cap 112 and side panels 116 uncoupled from the side cart 110. FIG. 4 shows two side panels 116 to show that in various embodiments, both sides of a side cart 110 can be configured to receive a side panel 116; however, in normal use, only one side panel 116 would be coupled to the side cart 110 and the side of the side cart 110 without a panel would be adjacent to a grill cart 106 or another side cart 110.

Top Cap

The top cap 112 is shown as a part of the grill systems of FIGS. 1-4, 7 and 8. In various embodiments, the top cap 112 can include a functional element. In some embodiments, the functional element can include one of the following: a second burner box, an ice box, a smoker, an oven, a sink, a work surface, a warming drawer, a sous vide cooker, a high heat burner, a ceramic cooker, a pellet grill, a portion of a pellet grill, a pellet feeder, a pellet hopper, or a refrigerator. In some embodiments of a grill system 100 with two or more side assemblies 104, each of the top caps 112 can include a different functional element. In some embodiments of a grill system 100 with two or more side assemblies 104, at least two of the functional elements can be the same. In some embodiments of a grill system 100 with two or more side assemblies 104, at least two of the functional elements can be different. The top caps 112 are easy to rearrange to move a particular functional element to a different location. The top caps 112 are also easy to interchange to provide a different function.

Side Carts

The side cart 110 can provide a support or a stand for the top cap 112. The side cart 110 can include a bottom portion 434 and a top portion 436 (shown in FIG. 4). The top cap 112 can be coupled to the top portion 436 of the side cart 110. In some embodiments, the bottom portion 434 can include wheels 438, or casters, such as to provide easy portability for the side assembly 104. In some embodiments, the wheels 438 can include a brake or lock to prevent the wheels from rotating thereby preventing the cart from moving. In various embodiments, the bottom portion 434 can include adjustable leveling feet or adjustable leveling wheels to allow a user to adjust the height of the feet or wheels, such as to accommodate for uneven surfaces.

In some embodiments, the side cart 110 can include one or more doors 440. The doors 440 can provide access to the interior of the side cart 110. In various embodiments, the interior of the side cart 110 can include one or more shelves. In some embodiments, the interior of the side cart 110 can be configured to house or store equipment.

Figure 5:
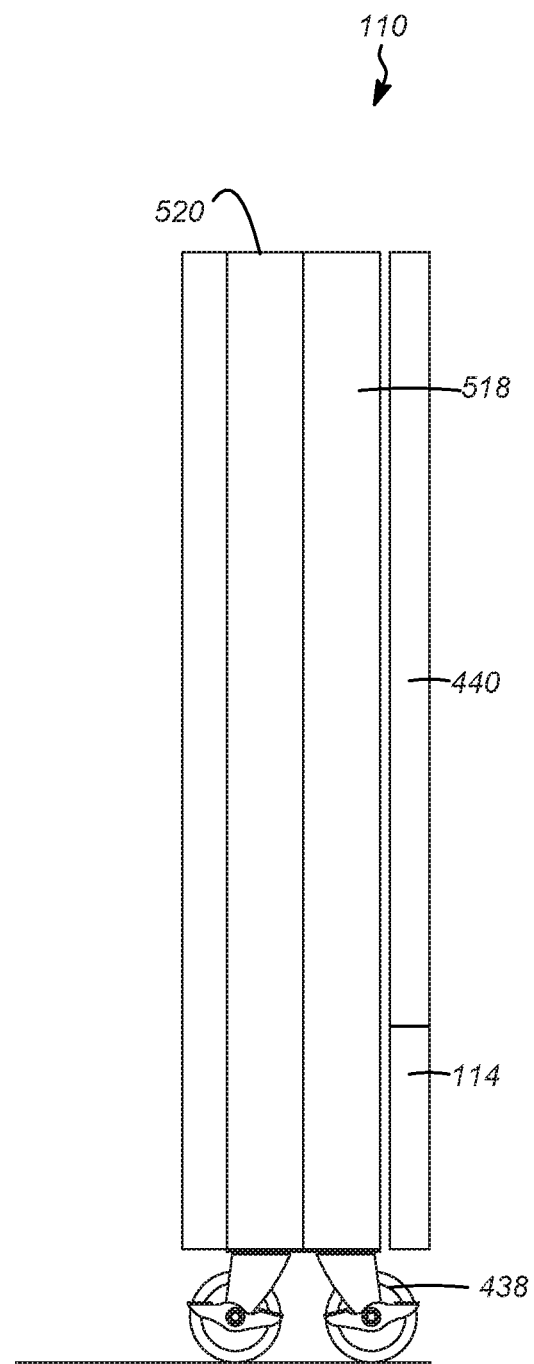
FIG. 5 is a side view of a side cart in a folded state in accordance with various embodiments herein.

As mentioned above, in various embodiments, the side carts 110 can transition between an upright state and a folded state. FIG. 5 shows an example of a side cart 110 in a folded state. In the folded state, the panel 116 is not coupled to the side cart 110.

Figure 7:
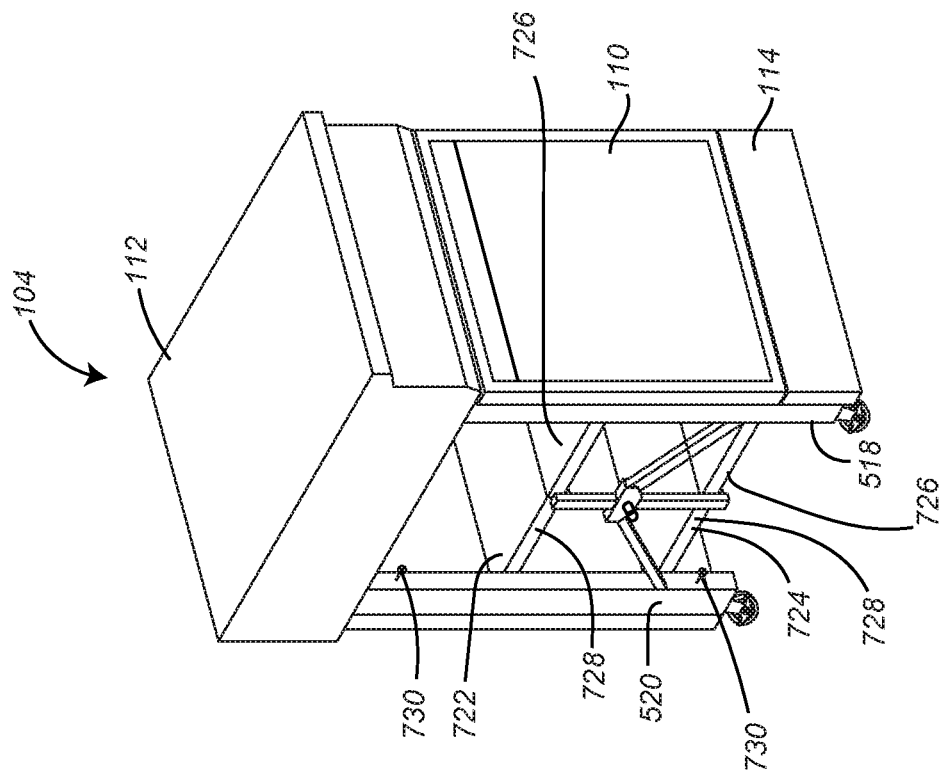
FIG. 7 is a perspective view of a side cart assembly in an upright state in accordance with various embodiments herein.

In some embodiments, the side cart 110 can include one or more shelves. Each shelf can include a front portion and a back portion. The front portion can be coupled to the back portion via a hinge or other rotatable coupling, such as to allow the front portion to rotate relative to the back portion as the side cart 110 is transitioned between the upright state and the folded state. In the folded state, the front portion can be substantially parallel to the back portion and substantially parallel to the front frame 518 of the side cart and the back frame 520 of the side cart. Further, in the folded state, the front portion and the back portion can be in different planes. In contrast, in the upright state, the front portion and the back portion can be substantially in the same plane, such as shown in FIG. 7. In various embodiments, "substantially parallel" can refer to two components that are within 15 degrees of parallel, within 10 degrees of parallel, within 5 degrees of parallel, within 3 degrees of parallel, within 1 degree of parallel, or are parallel.

Figure 6:
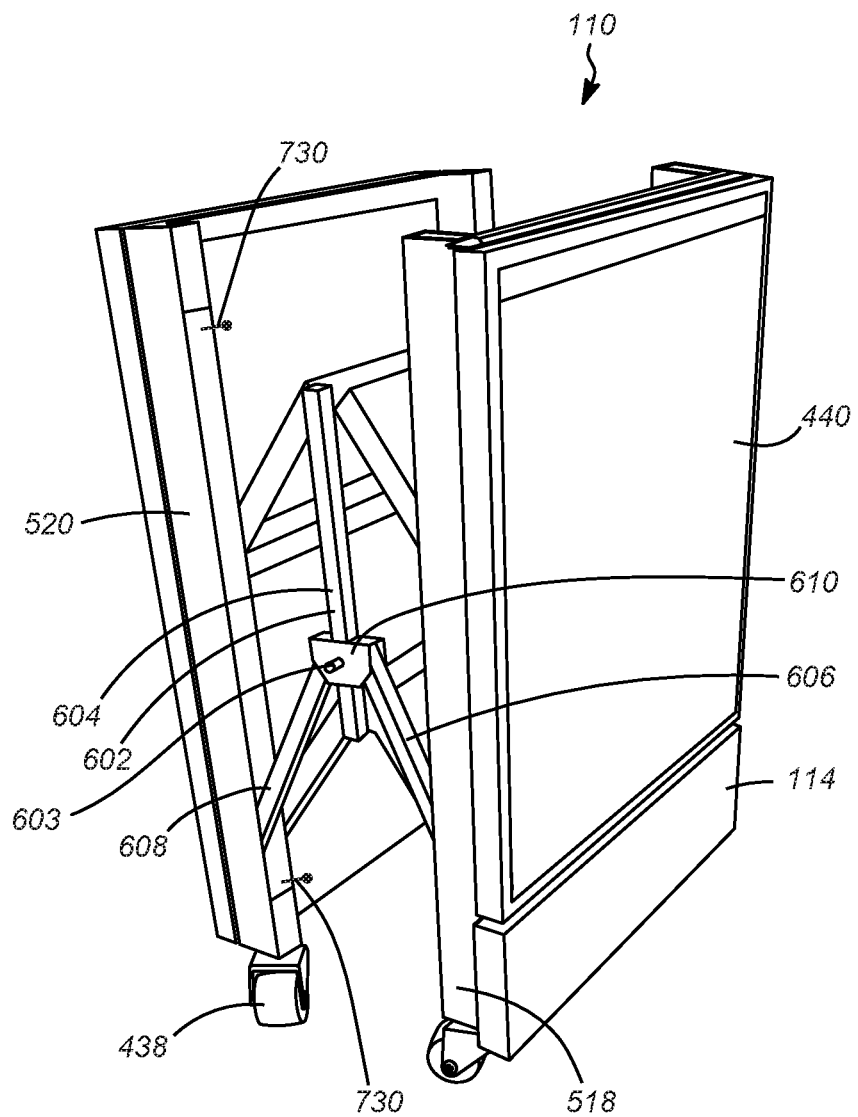
FIG. 6 is a perspective view of a side cart in a partially folded state in accordance with various embodiments herein.
Figure 8:
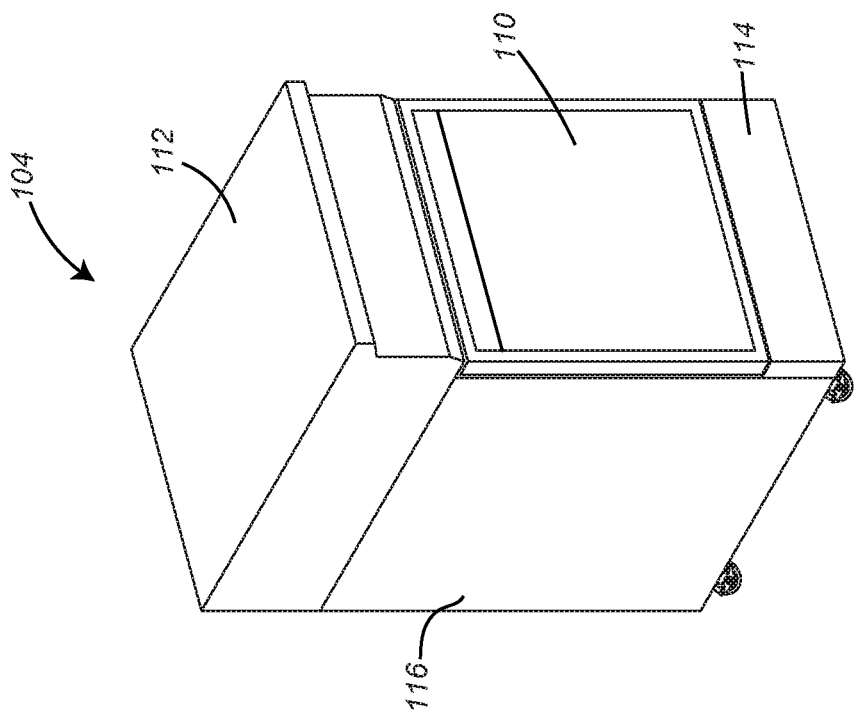
FIG. 8 is a perspective view of a side cart assembly in an upright state in accordance with various embodiments herein.

FIG. 6 shows a perspective view of a side cart 110 in a state between the folded state and the upright state, such as during a transition between the folded state and the upright state. FIG. 7 shows the side cart 110 in an upright state with a top cap 112 coupled to the side cart 110. In some embodiments, the arrangement shown in FIG. 7 is unlocked, since the side panel 116 has not been installed on the side cart 110. FIG. 8 shows the side cart 110 in the upright state with the side panel 116 installed on the side cart 110.

FIG. 7 shows a side assembly 104 including top cap 112 and side cart 110 with two shelves or frames 722, 724. Each shelf or frame includes a front portion 726 and a back portion 728. In the upright state, a top surface of the front portion 726 is co-planar or substantially co-planar with a top surface of the back portion 728, so that together they define a single shelf surface. The shelf 722 and shelf 724 are substantially perpendicular to the front frame 518 and the back frame 520.

In some embodiments, the shelves 722, 724 can be rotatably coupled to the frame of the side cart 110 to enable movement between the upright and folded states. The front portion 726 of each shelf 722, 724 can be rotatably coupled to the front frame 518. The back portion 728 can be rotatably coupled to the back frame 520. The front portion 726 can be rotatably coupled to the back portion 728, such as to allow the shelf portions 726, 728 to rotate as the side cart 110 is transitioned between the upright state shown in FIG. 7, the partially folded state shown in FIG. 6, and the folded states shown in FIG. 5.

Now referring to FIG. 6, a bracket 602 connects the components of the side cart, provides structural stability to the side cart, and facilitates the transition between the folded state and the upright state. The bracket 602 includes a vertical member 604 that is connected to both the front portion 726 and back portion 728 of each shelf 722, 724. In other embodiment the front portion 726 and the back portion 728 can be portions of a frame, such as a frame or a linkage that extends from the front frame 518 to the vertical member 604 or from the back frame 520 to the vertical member 604. The connection allows rotation of the front portion 726 and the back portion 728 with respect to each other and with respect to the vertical member. The bracket 602 also includes a front arm 606 and a rear arm 608. The front arm 606 extends between the vertical member 604 and the front frame 518. The rear arm 608 extends between the vertical member 604 and the back frame 520. The front arm 606 and rear arm 608 are connected to a sliding member 610, such that the front arm 606 and rear arm 608 can pivot with respect to the sliding member 610. The sliding member 610 can slide up and down along the vertical member 604 as the side cart 110 is transitioning between a folded state and an upright state. In some embodiments, a locking pin 603 can be included. The locking pin 603 can be at least partially inserted into an aperture on the vertical member 604, such as to lock the side cart 110 in the upright position. In some embodiments, the locking pin 603 provides a primary locking of the side cart 110 and the panel 116 being coupled to the side cart 110 can provide a secondary locking of the side cart 110.

In the embodiment of FIG. 6, a single bracket 602 is present on one end of the side cart. In other embodiments, a bracket 602 is present at both ends of the side cart.

In the folded state shown in FIG. 5, the front frame 518 and back frame 520 are close to each other or contacting each other. In the upright state shown in FIGS. 7 and 9, the front frame and back frame are at their maximum distance from each other.

Figure 12:
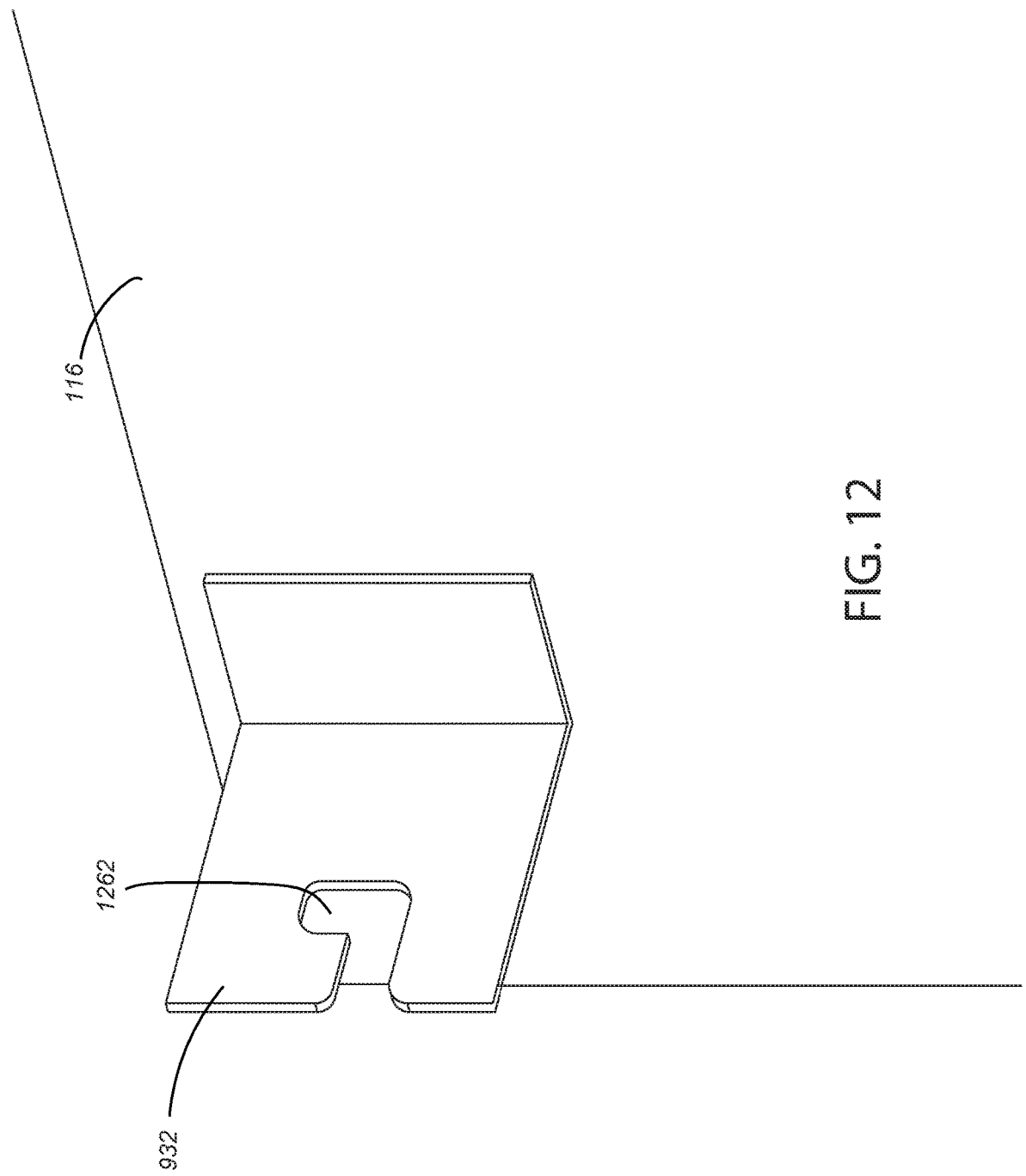
FIG. 12 is a perspective view of a female panel connection element in accordance with various embodiments herein.
Figure 13:
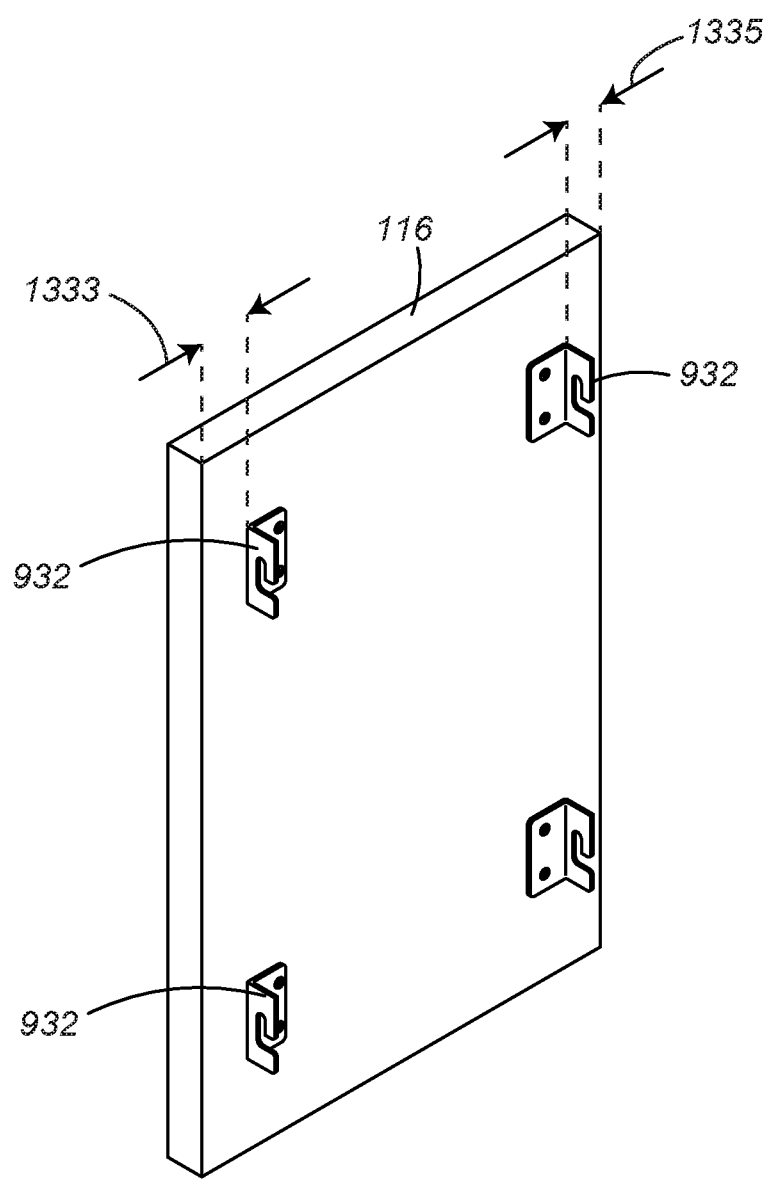
FIG. 13 is a perspective view of a back side of a panel in accordance with various embodiments herein.
Figure 14:
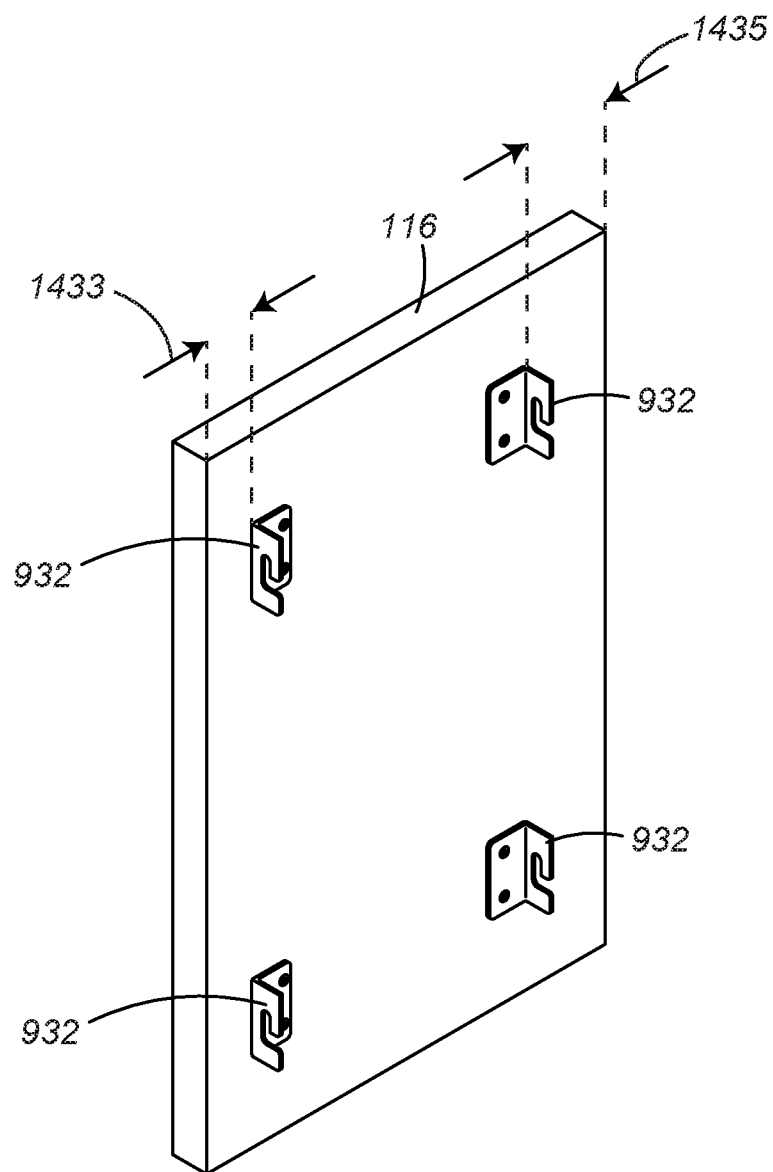
FIG. 14 is a perspective view of a back side of a panel in accordance with various embodiments herein.

In various embodiments, the side cart 110 can include one or more panel connection elements 730, such as a projection. The side panel 116 can also include one or more panel connection elements (shown in FIGS. 12 and 13). The panel connection elements 730 on the side cart can mate with the panel connection elements on the side panel 116 to couple the side panel 116 to the side cart 110. In some embodiments, the panel connection element 730 can include a projection and the panel connection element on the side panel 116 can define an aperture. The aperture can be configured for a portion of the projection to extend within thereby coupling the side panel 116 to the side cart 110, such as shown in FIGS. 12-14. In other embodiments, the panel connection elements 730 on the side cart 110 can define an aperture, and the panel connection element on the side panel 116 can include a projection.

FIG. 9 shows a top view of a side cart 110 and side panel 116. As discussed above the side cart 110 can include a front frame 518, a back frame 520 opposite from the front frame 518, and a shelf or frame 722 extending between the front frame 518 and the back frame 520.

In various embodiments, with a side panel 116 installed, the side cart 110 can be locked in the upright configuration, such that the front frame 518 and back frame 520 cannot be moved closer to each other without first removing the side panel. In some embodiments, the panel connection elements 932 on the panel 116 can be positioned such that they are located just within the forward most portion of the back frame 520 and just within the back most portion of the front frame 518, such as shown in FIG. 9. In this configuration, a portion of the side panel 116 is positioned between the front frame 518 and the back frame 520. The front frame 518 can be prevented from moving closer to the back frame 520 because of the interference with movement by the rigid panel connection elements 932 and the rigid side panel 116. In some embodiments, in the locked upright state, the panel connection elements 932 can contact the front frame 518 and the back frame 520.

In some embodiments, the panel 116 can be right handed, such as configured to fit on the right side of a side cart, or left handed (shown in FIG. 9), such as configured to fit on the left side of a side cart 110. FIG. 9 shows a top view of a side cart 110 with a left handed panel 116 attached to a left side of the side cart 110. A panel 116 can be defined as right or left handed based on the distance of the connection elements 932 to the adjacent edges of the panel 116. As can be seen in FIG. 9, the front panel connection element 932 can be located a first distance 915 away from the front edge of the panel 116. The first distance 915 can be equivalent to the depth of front post 937. The rear panel connection element 932 can be located a second distance 917 away from the back edge of the panel 116. The second distance 917 can be equivalent to the depth of the back post 939 and the rear frame 941.

In some embodiments, the front post 937 can have a depth that is equivalent to the depth of the back post 939 and the rear frame 941, such that the first distance 915 is equivalent to the second distance 917. As result, the panel 116 can be universal, such that it could fit on either the right side of the grill system 100 or the left side of the grill system 100.

Grill Cart

Figure 10:
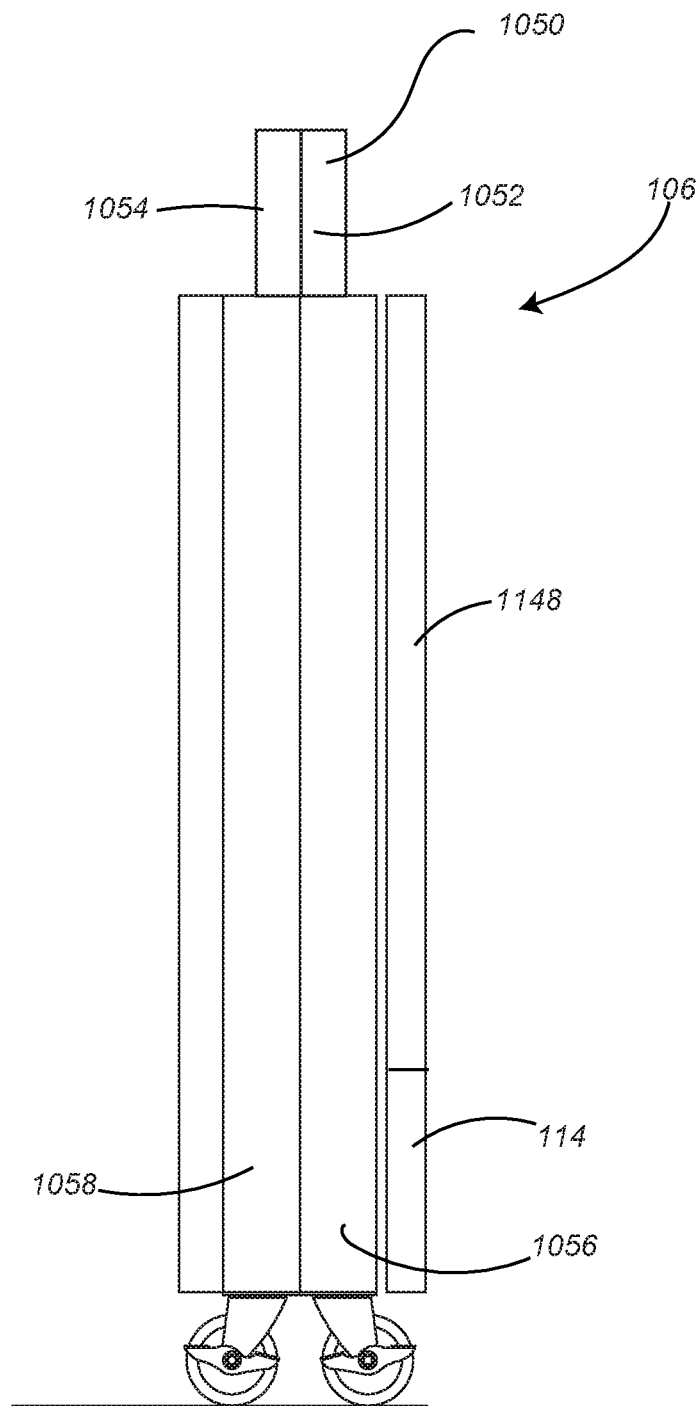
FIG. 10 is a side view of a grill cart in a folded state in accordance with various embodiments herein.

The grill cart 106 can provide a support or a stand for the burner box 108. Similar to the side cart 110, the grill cart 106 can transition between a folded state (shown in FIG. 10) and an upright state (shown in FIG. 11). FIG. 10 shows a side view of a grill cart 106 in a folded state and FIG. 11 shows a perspective view of a grill cart 106 in an upright state.

Figure 11:
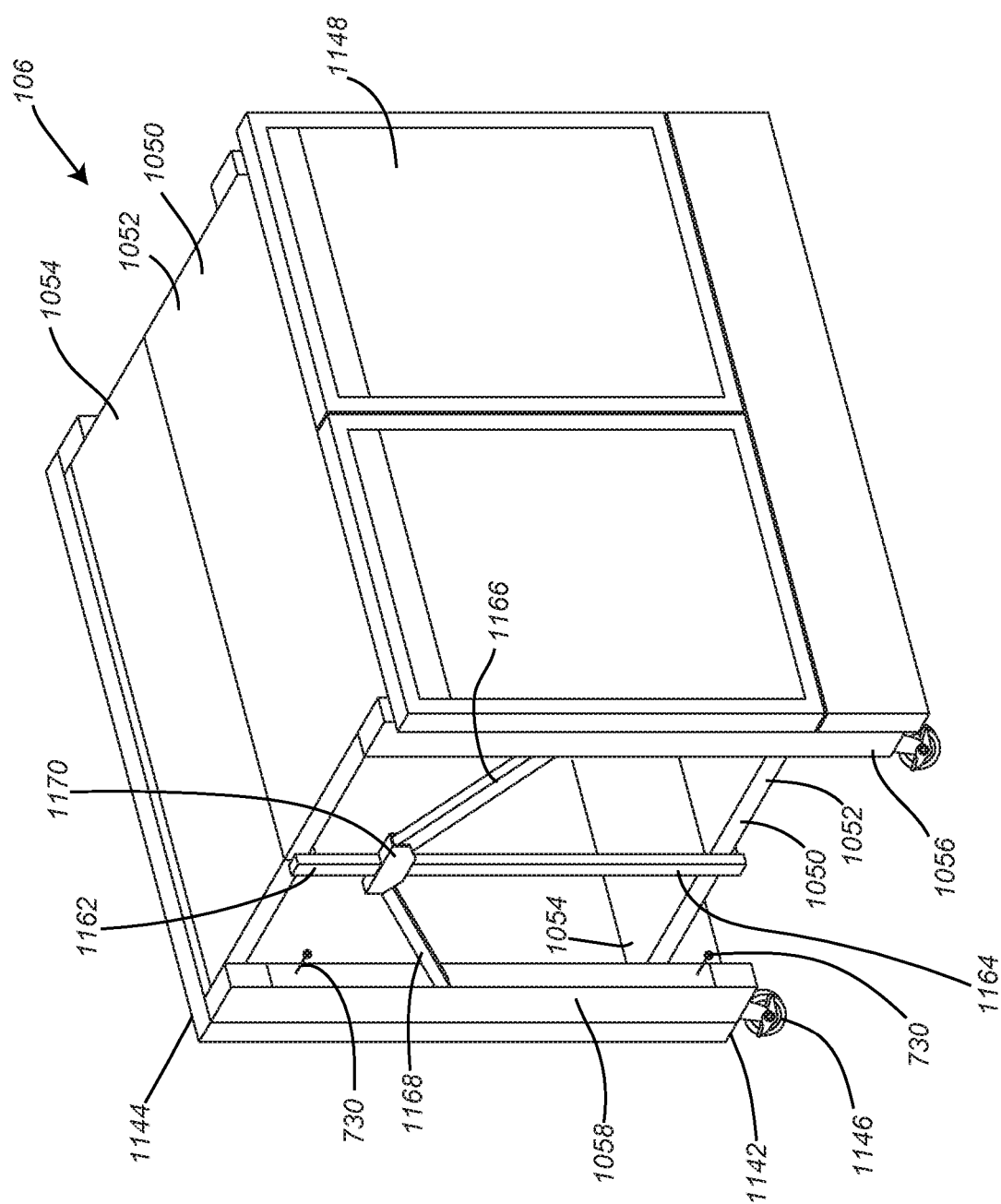
FIG. 11 is a perspective view of a grill cart in an upright state in accordance with various embodiments herein.

The grill cart 106 can include a bottom portion 1142 and a top portion 1144 (shown in FIG. 11). The burner box 108 (FIG. 1) can be coupled to the top portion 1144 of the grill cart 106. In some embodiments, the bottom portion 1142 can include wheels 1146, or casters, such as to provide easy portability for the grill assembly 102. In some embodiments, the wheels 1146 can include a brake or lock to prevent the wheels from rotating thereby preventing the cart from moving. In various embodiments, the bottom portion 1142 can include adjustable leveling feet or adjustable leveling wheels to allow a user to adjust the height of the feet or wheels, such as to accommodate for uneven surfaces, which can be common in outdoor applications.

In some embodiments, the grill cart 106 can include one or more doors 1148. The doors 1148 can provide access to the interior of the grill cart 106. In various embodiments, the interior of the grill cart 106 can house a gas tank. The gas tank can supply the burner box 108 with gas. In some embodiments, the burner box 108 can burn charcoal, wood, or other fuel sources. In some embodiments, the burner box 108 can have the form of a pellet grill. In some embodiments, the burner box 108 can have the form of a charcoal grill. In some embodiments, the interior of the grill cart 106 can be configured to house or store other related equipment, such as tongs, spatulas, or brushes.

FIG. 10 is a side view of a grill cart 106 in folded configuration in accordance with various embodiments herein. In various embodiments, the grill cart 106 can be transitioned between a folded state and an upright state. In an upright state, the grill cart 106 can provide a base or stand for the burner box 108. In the folded state, the grill cart 106 can be easily transported or stored. When in a folded state the grill cart 106 can have a smaller volume compared to when the grill cart 106 is in the upright state. In various embodiments, the grill cart 106 can be transitioned between the folded state and upright state without any tools.

Similar to the side cart 110, in various embodiments, the grill cart 106 can include one or more side panel connection elements 730. In various embodiments, the panel connection elements 730 are the same as the panel connection elements 730 on the side cart 110, such as to allow the side panels 116 to be connected to either a side cart 110 or a grill cart 106 in the same manner.

Similar to the side cart 110, the grill cart 106 can include one or more shelves or frames (such as portion of a shelf or a portion of the perimeter of a shelf) 1050. Each shelf or frame 1050 can include a front portion 1052 and a back portion 1054. In the upright state, a top surface of the front portion 1052 of a shelf 1050 is coplanar with a top surface of the back portion 1054 of the shelf 1050. Each shelf 1050 is substantially perpendicular to the front frame 518 and the back frame 520.

In some embodiments, each shelf portion can be rotatably coupled to the frame of the grill cart 106, to a bracket, and to each other. The front portion 1052 can be rotatably coupled to the front frame 1056. The back portion 1054 can be rotatably coupled to the rear frame 1058. The front portion 1052 can be rotatably coupled to the back portion 1054, such as to allow the shelf portions 1052, 1054 to rotate as the grill cart 106 is transitioned between the upright state and the folded state.

A bracket 1162 connects the components of the grill cart, provides structural stability to the side cart, and facilitates the transition between the folded state and the upright state. The bracket 1162 includes a vertical member 1164 that is connected to both the front portion 1052 and back portion 1054 of each shelf 1050. The connection allows rotation of the front portion 1052 and the back portion 1054 with respect to each other and with respect to the vertical member. The bracket 1162 also includes a front arm 1166 and a rear arm 1168. The front arm 1166 extends between the vertical member 1164 and the front frame 1056. The rear arm 1168 extends between the vertical member 1164 and the rear frame 1058. The front arm 1166 and rear arm 1168 are connected to a sliding member 1170, such that the front arm 1166 and rear arm 1168 can pivot with respect to the sliding member 1170. The sliding member 1170 can slide up and down along the vertical member 1164 as the grill cart 106 is transitioning between a folded state shown in FIG. 10 and an upright state shown in FIG. 11. It is possible for the bracket 1162 to be provided at one end of the grill cart or at both ends of the grill cart.

In the folded state shown in FIG. 11, the front frame 1056 and rear frame 1058 are close to each other or contacting each other. In the upright state shown in FIG. 11, the front frame and rear frame are at their maximum distance from each other.

It should be understood that the general construction and operation of the grill cart 106 can be the same as the side cart 110, such as with regards to the front frame, back frame, upright configuration, folded configuration, panel connection, bracket, locking pin, and locking of the cart in the upright configuration. For example, the grill cart 106 can be provided with a locking pin on an outside surface of the sliding member 1170, similar to locking pin 603 shown in FIG. 6 on the side cart 110. In another example, the grill cart 106 can be provided with a locking pin on an inside surface of the sliding member 1170.

Various alternate examples of grill carts with pivoting and rotating panels to allow the cart to transition between a folded state and an upright state can be found in co-owned U.S. application Ser. No. 15/937,666 filed on Mar. 27, 2018 and U.S. application Ser. No. 15/262,733 filed on Sep. 12, 2016, which are hereby incorporated by reference in their entirety.

Panel Connections

Figure 15:
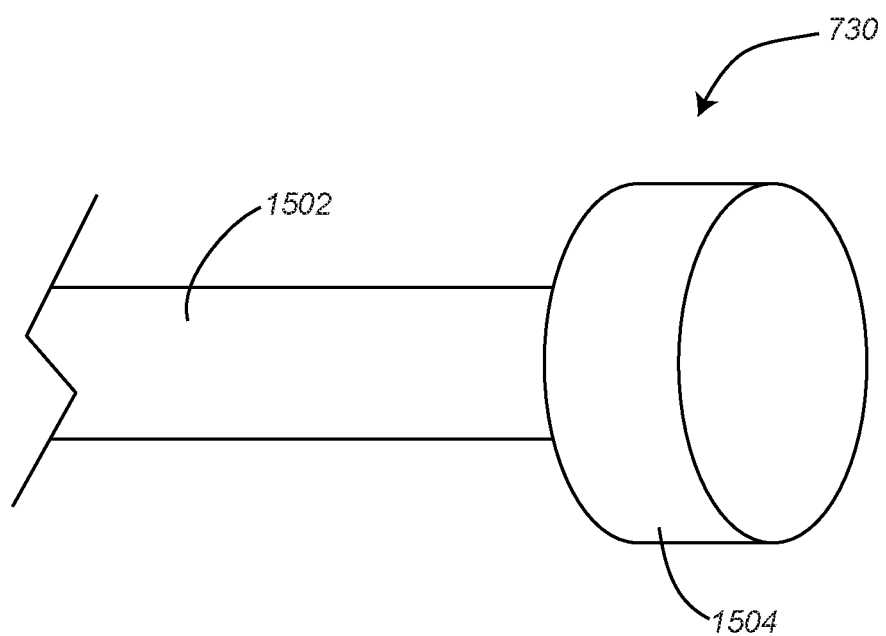
FIG. 15 is a side view of a male panel connection element in accordance with various embodiments herein.

FIG. 12 shows a perspective view of one example of a panel connection element 932 according to various embodiments. FIG. 13 shows a perspective view of one example of an inner surface of the panel 116. FIG. 14 shows a perspective view of another example of an inner surface of the panel 116. FIG. 15 shows a perspective view of one example of a panel connection element 730 on either the side cart 110 or the grill cart 106. It should be understood that the male connection element 730 shown in FIG. 15 could be located on the panel 116, and the female connection element 932 shown in FIG. 12 could be located on the grill cart 106 and side cart 110. Also, many different configurations of the panel connection elements could be used in the system.

In various embodiments, the panel 116 can include more than one panel connection element 932, such as two, three, four, or six. The grill cart 106 and the side cart 110 can include the same number of panel connection elements 730 on each side as the panel 116 includes. In some embodiments, the panel 116 can include a panel connection element 932 in each of the four corners, such as shown in FIG. 13.

FIG. 13 shows a back view of a universal panel 116 including a panel connection element 932 located a first distance 1333 away from an adjacent edge of the panel 116 and a second panel connection element 932 a second distance 1335 away from an adjacent edge of the panel 116. The first distance 1333 on the panel 116 can relate to the first distance 915 of the side cart shown in FIG. 9. Similarly, the second distance 1335 of the panel 116 can relate to the second distance 917 of the side cart 110. In some embodiments, the first distance 1333 can be equivalent to the second distance 1335 shown in FIG. 13. Such an embodiment is consistent with a system where the same panel 116 can be universal to fit either a side cart 110 on the right side of the grill cart 106 or a side cart 110 on the left side of the grill cart 106. In some embodiments, the first distance 1333 can be larger than the second distance 1335. In some embodiments, the first distance 1333 can be smaller than the second distance 1335.

FIG. 14 shows a back view of a left handed side panel 116 including a panel connection element 932 located a first distance 1433 away from an adjacent edge of the panel 116 and a second panel connection element 932 located a second distance 1435 away from an adjacent edge of the panel. In the embodiment of FIG. 14, the first distance 1433 is smaller than the second distance 1435, such as to conform to the side cart 110 shown in FIG. 9 which is designed to accept a left handed side panel.

In various embodiments, the panel connection element 932 can include an aperture 1262 (shown in FIG. 12) configured to mate with a projection shaped panel connection element 730 (shown in FIG. 15). The panel connection element 730 can be configured to fit at least partially within the aperture 1262 to couple the panel 116 to a grill cart 106 or side cart 110.

In one example, now referring to FIG. 15, the panel connection element 730 includes a neck portion 1502 and a head portion 1504. In some examples, the neck portion 1502 and the head portion are both cylindrical. The head portion has a larger width dimension, such as diameter in the case of cylindrical shapes, than the neck portion.

The mating female panel connection element 932 includes base portion attached to the panel and an extension portion that extends away from the side panel substantially perpendicular to the base portion. The base portion and extension portion are both rectangular plates. In one example, the panel connection element 932 is made of metal. In one example, the panel connection element is made from a metal plate that is bent to form an angle, such as a 90 degree angle.

In one example, the extension portion of the panel connection element defines an aperture 1262. The aperture 1262 can be an L-shaped aperture sized to receive the neck portion of the panel connection element 730. The aperture 1262 has an open leg and a closed leg extending substantially perpendicular to the open leg from a junction location. As the side panel is attached to the panel connection element 730, the neck portion of the panel connection element 730 is received into the open leg of the L-shaped aperture and advanced along the open leg until the neck portion reaches the junction location. Then the side panel is lowered into an attached position where the neck portion rests in the closed leg portion of the aperture. The weight of the side panel is born by the panel connection element 730 to allow the side panel to be positioned on the side cart or grill cart.

A width dimension of the aperture 1262 is larger than a largest width dimension, such as diameter, of the neck portion of the panel connection element 730. The head portion has a larger width dimension, such as diameter, than the width of the aperture 1262.

In alternate embodiments, the panel 116 can be connected to the grill cart 106 or side cart 110 with a latch mechanism or bulldog catch.

Toe Kick Panel Connections

FIG. 16 shows a perspective view of an end portion of a toe kick panel 114. FIG. 17 shows a perspective view of a location 1700 of the side cart or grill cart to which the toe kick panel 114 will attach. FIG. 2 shows toe kick panels 114 located on a grill cart and a side cart. Location 1700 is under the toe kick panels in FIG. 2.

In some examples, the connection structure shown on the toe kick panel 114 in FIG. 16 can be located on the side cart or grill cart at location 1700, and the connection feature shown in FIG. 17 can be located on the toe kick panel 114.

The connection between a toe kick panel 114 and a grill cart 106 or a side cart 110 can include an aperture 1666 and projection 1768. The aperture 1666 can be configured to receive at least a portion of the projection 1768 to couple the toe kick panel 114 to the side cart 110 or the grill cart 106.

In one example, now referring to FIG. 17, the projection 1768 includes a neck portion 1702 and a head portion 1704. In some examples, the neck portion 1702 and the head portion 1704 are both cylindrical. The head portion has a larger width dimension, such as diameter in the case of cylindrical shapes, than the neck portion.

One example of a mating female connection element is an aperture 1666 defined on one wall of the toe kick panel 114 as shown in FIG. 16. In one example, the aperture is keyhole shaped, including a circular portion for receiving the projection 1768 and a lateral portion sized to accommodate the neck portion 1702 but not allow the head portion 1704 to pass through. As the toe kick panel is attached to the location 1700, the head portion and neck portion of the projection is received into the circular portion of the aperture 1666. Then the toe kick panel 114 is moved laterally so that the neck portion is received in the lateral portion of the aperture. The weight of the toe kick panel is born by the projections 1768 to allow the toe kick panel to be positioned on the side cart or grill cart.

In various embodiments, the toe kick panel 114 can include one connection structure, one connection structure at each end, two connection structures at each end, or various numbers of connection structures, such as two, three, four, or six. The location 1700 where the toe kick panel will be attached to the grill cart 106 or the side cart 110 can include the same number of toe kick panel connection elements as the toe kick panel 114. In some embodiments, the toe kick panel 114 can include a connection structure, such as an aperture 1666 or a projection 1768, in each of four corners.

System of Panels

Figure 18:
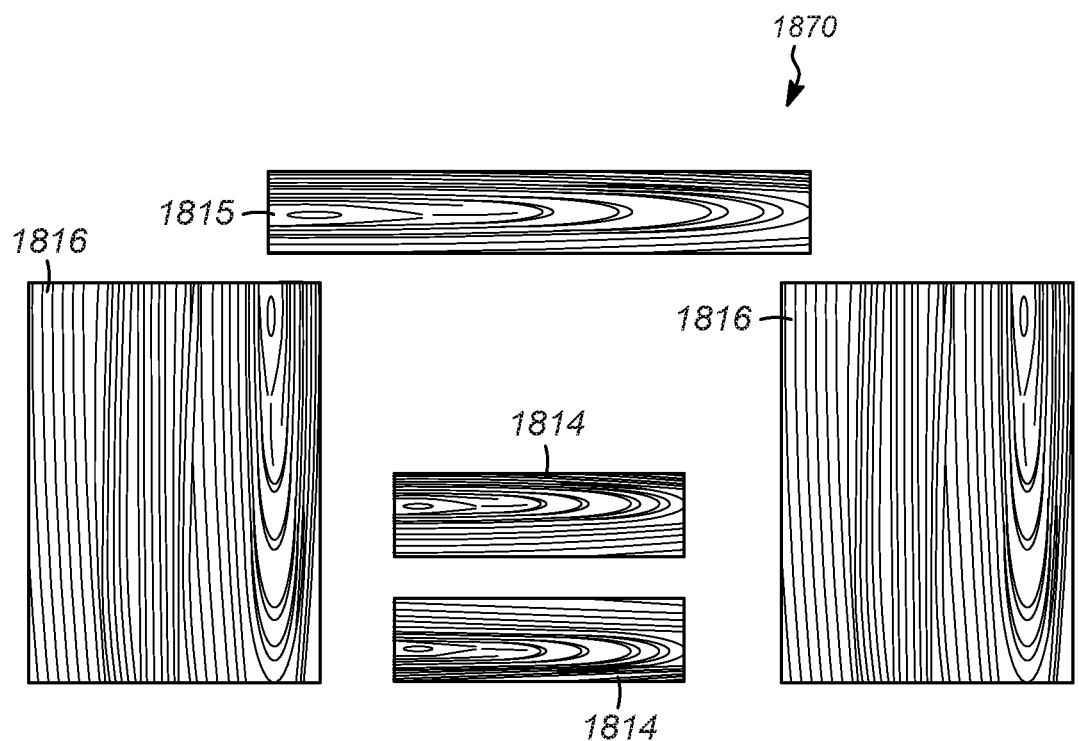
FIG. 18 is a front view of a system of panels in accordance with various embodiments herein.

FIG. 18 shows a front view of a set of panels 1870 in accordance with various embodiments herein. A set of panels 1870 can include at least one side panel 1816, at least one toe kick panel 1814 for a side cart, and at least one toe kick panel 1815 for a grill cart. In an embodiment, a set of panels 1870 can include two side panels 1816 and three toe kick panels 1814, such as one for a grill cart 106 and one for each of the two side carts 110. In various embodiments, the set of panels 1870 can all include a similar design, pattern, or finish on an outer surface, such as a painted or otherwise applied common color, wood, stone, or metal, such as stainless steel.

Figure 19:
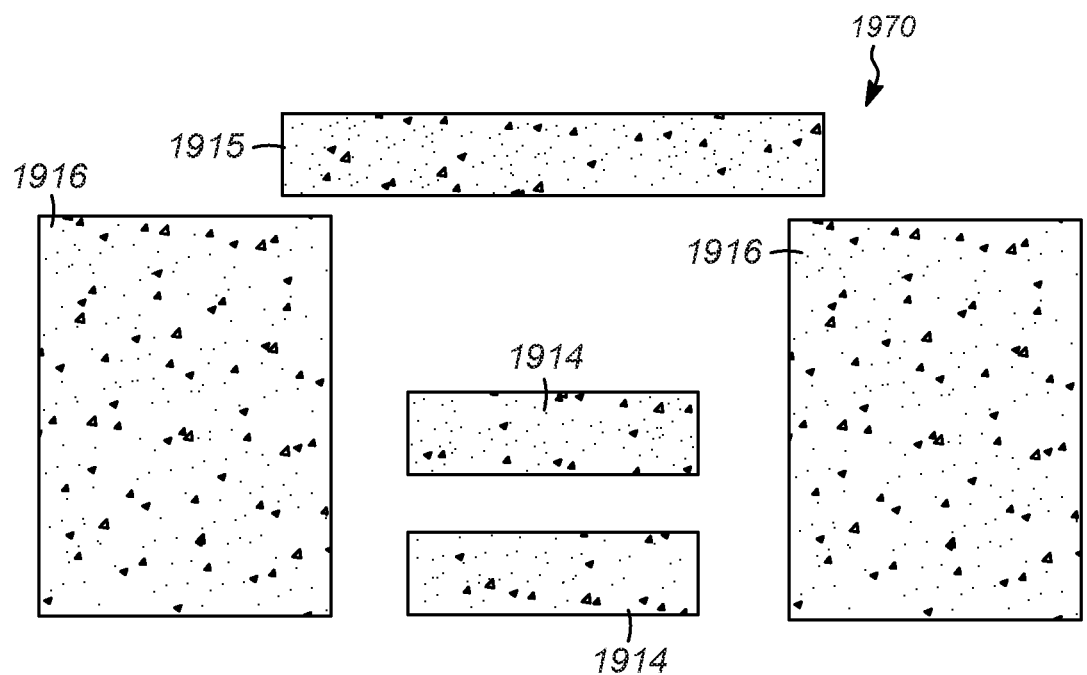
FIG. 19 is a front view of a system of panels in accordance with various embodiments herein.

FIG. 19 shows a front view of a set of panels 1970 with a different design than the set of panels 1870 shown in FIG. 18. The set of panels 1970 can include at least one side panel 1916, at least one toe kick panel 1914 for a side cart, and at least one toe kick panel 1915 for a grill cart. In various embodiments, a user can change the general appearance of the grill system 100 by switching out a first set of panels with a second set of panels having a different design. In an embodiment, a first and a second side panel 1816 can include a first design, and a third and a fourth side panel 1916 can include a second, different design.

Figure 20:
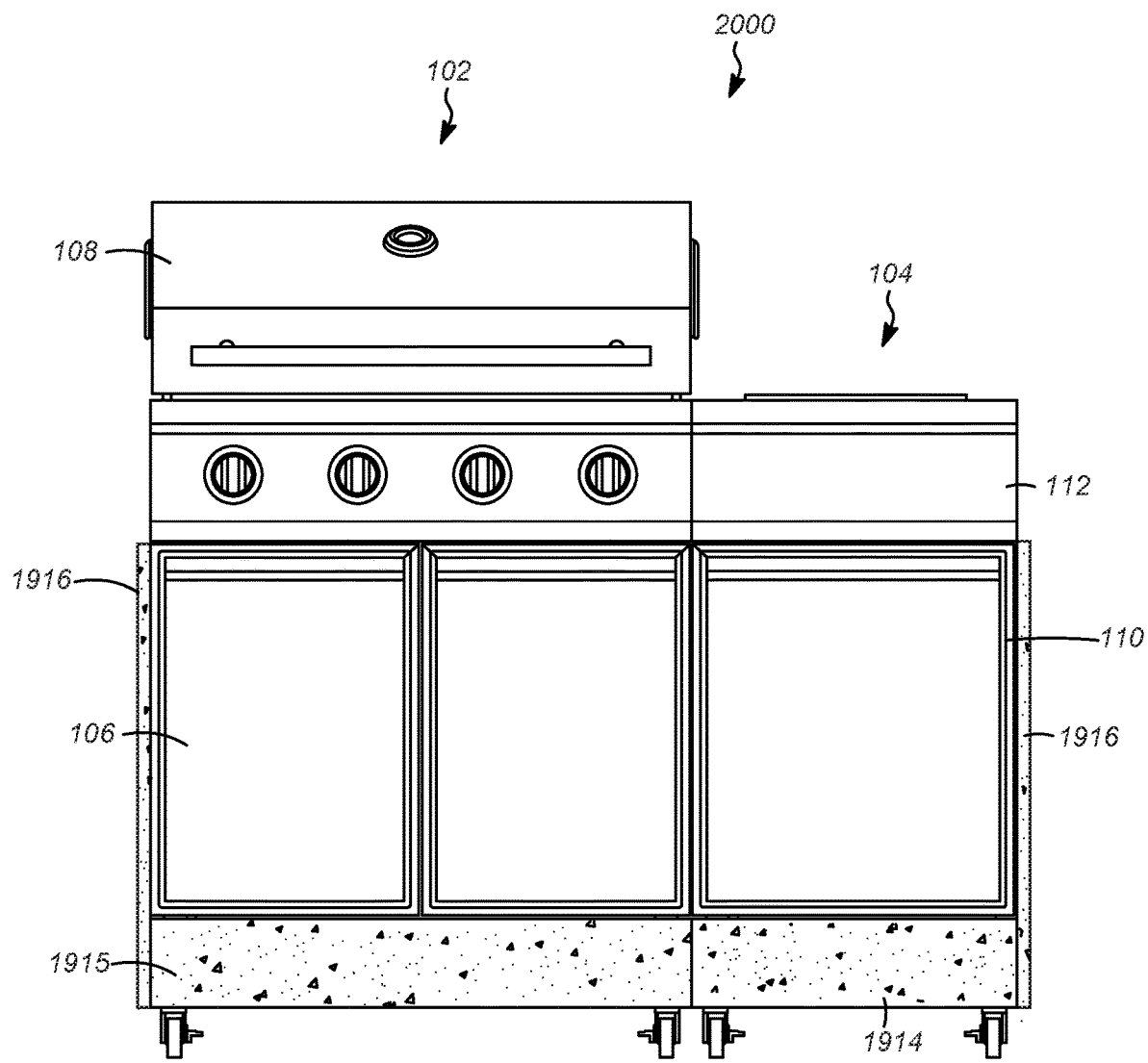
FIG. 20 is a front view of a grill system in accordance with various embodiments herein.

FIG. 20 shows a front view of a grill system 2000 with a set of panels 1970 with a first design installed on the grill system 2000. The system is designed to allow removing the first set of panels 1970 and attaching a second set of panels, such as the set of panels 1870 shown in FIG. 18. The second set of panels 1870 could be installed on the grill system after the first set of panels 1970 is removed. In some examples, the panels can be removed and attached without any tools. In some examples, all of the side panels have the same connection structures and all of the toe kick panels have the same connection structures, while all of the connection locations on the grill cart and side cart have a common mating connection structure. As a result, each side panels can be used in multiple locations on the grill system and each side cart toe kick panel can be used in multiple location on the grill system. The ability to interchange locations of the side panels and toe kick panels reduces the number of inventory items for the grill system.

In various examples, a set of panels includes any combination of one side panel, two side panels, one grill cart toe kick panel, and one, two, three or four side cart toe kick panels. In one example, a set of panels includes two side panels, one toe kick panel for a grill cart, and one toe kick panel for a side cart.

In various examples, each of the panels in a set of panels is a decorative panel having an inner side configured to face the grill system and an outer side configured to face away from the grill system and away from the connection elements. The outer side includes a design element.

There are many options available for the design element on an outer surface of a panel. One option is a sheet of material, such as a sheet of stainless steel, wood, wood laminate, plastic, or other material. Another option is a sheet of a material structured to have with an appearance of stone. Another option is a surface decoration using paint, a coating, or a texture.

Methods

Figure 21:
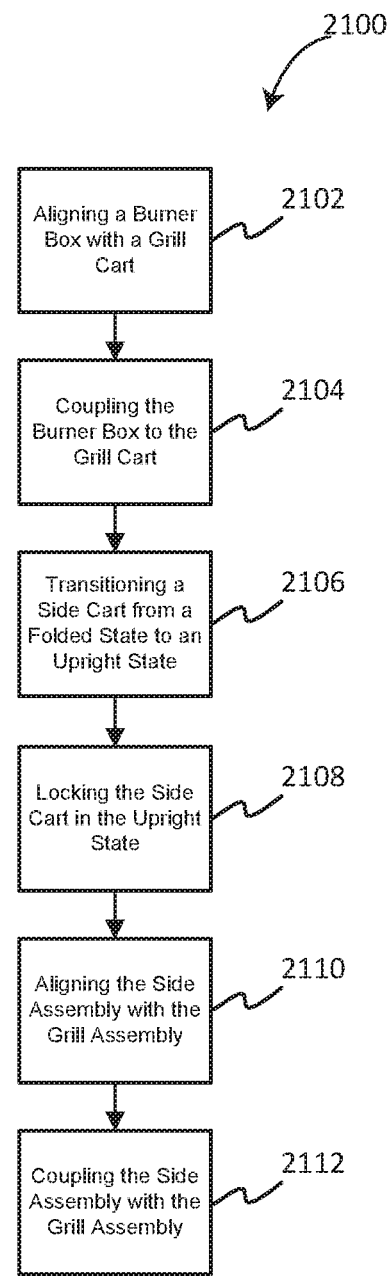
FIG. 21 is a flow chart shows various steps for assembling a grill system according to various embodiments.

FIG. 21 is a flow chart depicting various steps in a method 2100 for assembling a grill system according to various embodiments. The method 2100 can include aligning a burner box with a top portion of a grill cart, step 2102. The method 2100 can include coupling the burner box to the grill cart to form a grill assembly, step 2104. The method 2100 can include transitioning a first side cart from a folded state to an upright state, step 2106. The method 2100 can include locking the first side cart in the upright state, such as by coupling a panel to the side cart, step 2108. In some embodiments, coupling the panel to the side cart can form a side assembly. In some embodiments, steps 2106 and 2108 can take place before steps 2102 and 2104.

The method 2100 can include aligning the first side assembly with the grill assembly, step 2110. The method 2100 can include coupling the first side assembly to the grill assembly, step 2112.

In some embodiments, the method 2100 can include coupling a second panel to the grill cart. The second decorative panel can be coupled to a side of the grill cart that is opposite from the first side assembly.

In some embodiments, the method 2100 can include aligning a first top cap with the side cart and coupling the first top cap with the first side cart. The first top cap can include a functional element.

In some embodiments, the method 2100 can include transitioning a second side cart from a folded state to an upright state, locking the second side cart in the upright state by coupling a second decorative panel to the second side cart thereby forming a second side assembly; aligning the second side assembly with the grill assembly on the opposite side from the first side assembly; and coupling the second side assembly to the grill assembly.

In some embodiments, the method 2100 can include aligning a first top cap with the first side cart; coupling the first top cap with the first side cart; aligning a second top cap with the second side cart; and coupling the second top cap with the second side cart. The first top cap and the second top cap can include functional elements selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator. In some embodiments, the functional element of the first top cap is not equivalent to the functional element of the second top cap.

Figure 22:
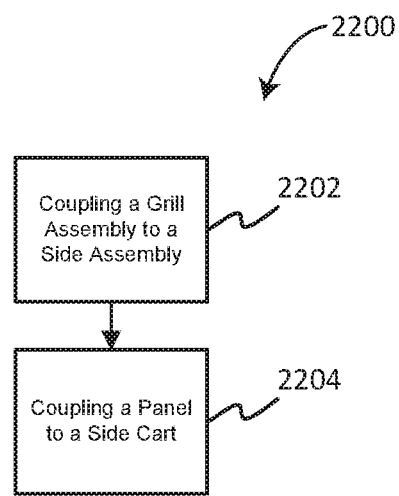
FIG. 22 is a flow chart shows various steps for assembling a grill system according to various embodiments.

FIG. 22 is a flow chart depicting various steps in a method 2200 for assembling a grill system according to various embodiments. The method 2200 can include coupling a grill assembly to a first side assembly, step 2202. The grill assembly can include a grill cart. The grill cart can include a front side, a back side, a first side, and a second side. The first side assembly can include a first side cart. The first side cart can include a front side, a back side, a first side, and a second side. The method 2200 can include coupling a first decorative panel to a side of the first side cart or a side of the grill cart, step 2204. The first decorative panel can be configured to be coupled to both the side of the first side cart or the side of the grill cart. In some embodiments, coupling the grill assembly to the first side assembly can result in the first side of the grill cart being adjacent to the first side of the first side cart, and the front side of the grill cart facing in the same direction as the front side of the first side cart.

In some embodiments, the method 2200 can include coupling a second decorative panel to the second side of the grill cart. In some embodiment, the first decorative panel can include a first design on an outer surface facing away from the side cart, and second decorative panel can include the first design on an outer surface facing away from the grill cart.

In some embodiments, the method 2200 can include coupling the grill assembly to a second side assembly. The second side assembly can include a second side cart. The second side cart can include a front side, a back side, a first side, and a second side. The method 2200 can include coupling a second decorative panel to the second side of the second side cart. In some embodiments, coupling the grill assembly to the second side assembly results in the second side of the grill cart being adjacent to the first side of the second side cart, and the front side of the grill cart facing in the same direction as the front side of the second side cart.

In some embodiments, the method 2200 can include uncoupling the first decorative panel from the first side cart; removing the first decorative panel from the first side assembly; coupling a second side assembly to the first side assembly. The second side assembly can include a second side cart. The second side cart can include a front side, a back side, a first side, and a second side. The method 2200 can include coupling the first decorative panel to the second side of the second side cart. Coupling the second side assembly to the first side assembly can result in the second side of the first side cart being adjacent to the first side of the second side cart, and the front side of the first side cart facing in the same direction as the front side of the second side cart.

In some embodiments, the method 2200 can include coupling a first top cap to the first side cart. In some embodiments, the method 2200 can include coupling the grill assembly to a second side assembly. The second side assembly can include a second side cart. The second side cart can include a front side, a back side, a first side, and a second side.

In some embodiments, the method 2200 can include coupling a second decorative panel to the second side of the second side cart; and coupling a second top cap to the second side cart. In some embodiments, coupling the grill assembly to the second side assembly can result in the second side of the grill cart being adjacent to the first side of the second side cart, and the front side of the grill cart facing in the same direction as the front side of the second side cart. In some embodiments, the selected functional element for the first top cap is not equivalent to the selected functional element for the second top cap.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A grill system, comprising:
    a grill assembly comprising a grill cart and a burner box coupled to a top portion of the grill cart; and
    a first side assembly comprising a first side cart and a first panel; wherein the first side cart is configured to be transitioned between a folded state and an upright state;
    wherein the grill assembly is coupled to the first side assembly;
    wherein the first side cart comprises a panel connection projection and the first panel defines a panel connection aperture configured for a portion of the panel connection projection to extend within;
    wherein when the first panel is coupled to an outer side of the first side cart, the first side cart is locked into the upright state.

2. The grill system of claim 1, wherein the first side cart comprises:
    a front frame;
    a back frame opposite from the front frame; and
    a first shelf extending from the front frame to the back frame;
    wherein the first shelf comprises a front half and a back half, the front half rotatably coupled to the back half and rotatably coupled to the front frame, and the back half rotatably coupled to the back frame, such that when the first side cart is in the folded state the front half and the back half are not located in the same plane and when the first side cart is in the upright state the front half and the back half are in the same plane.

3. The grill system of claim 2, wherein in the folded state the front half is substantially parallel with the back half, the front frame and the back frame.

4. The grill system of claim 3, wherein in the upright state the front half is substantially parallel with the back half, and the first shelf is substantially perpendicular to the front frame and the back frame.

5. The grill system of claim 2, wherein the first side cart further comprises a second shelf extending from the front frame to the back frame;
    wherein the second shelf comprises a front half and a back half, the front half rotatably coupled to the back half and rotatably coupled to the front frame, and the back half rotatably coupled to the back frame, such that when the first side cart is in the folded state the front half and the back half are not located in the same plane and when the first side cart is in the upright state the front half and the back half are in the same plane.

6. The grill system of claim 2, wherein in the locked upright state, the first panel prevents the back frame of the first side cart from being able to be moved closer to the front frame of the first side cart.

7. The grill system of claim 2, wherein in the locked upright state, the first panel is disposed between a portion of the front frame and a portion of the back frame.

8. The grill system of claim 7, wherein in the locked upright state, the first panel contacts a portion of the front frame and a portion of the back frame.

9. The grill system of claim 2, further comprising a toe kick panel coupled to the front frame of the first side cart;
    wherein the toe kick panel is substantially perpendicular to the first panel when the first panel is coupled to the outer side of the first side cart;
    wherein the toe kick panel includes a first design and the first panel include the first design.

10. The grill system of claim 1, further comprising a second panel;
wherein the second panel is coupled to the grill cart on an opposite side of the grill cart from the first side assembly.

11. The grill system of claim 1, further comprising a second side assembly comprising a second side cart and a second panel, wherein the second side cart is configured to be transitioned between a folded state and an upright state;
wherein the second side assembly is coupled to the grill assembly on an opposite side of the grill assembly from the first side assembly;
wherein when the second panel is coupled to an outer side of the second side cart, opposite from the grill assembly, the second side cart is locked in the upright state.

12. The grill system of claim 1, wherein the first panel and the first side cart are coupled together with a latch.

13. (Withdrawn and Currently Amended) A method of assembling a grill system, comprising:
aligning a burner box with a top portion of a grill cart;
coupling the burner box to the grill cart to form a grill assembly;
transitioning a first side cart from a folded state to an upright state;
locking the first side cart in the upright state thereby forming a first side assembly by coupling a first panel to the first side cart, the first side cart comprising a panel connection projection and the first panel comprising a panel connection aperture configured for a portion of the panel connection projection to extend within;
aligning the first side assembly with the grill assembly; and
coupling the first side assembly to the grill assembly.

14. The method of assembling a grill system of claim 13, further comprising:
coupling a second panel to the grill cart; wherein the second panel is coupled to a side of the grill cart that is opposite from the first side assembly.

15. The method of assembling a grill system of claim 13, further comprising:
aligning a first top cap with the first side cart; and
coupling the first top cap with the first side cart;
wherein the first top cap comprises a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator.

16. The method of assembling a grill system of claim 13, further comprising:
transitioning a second side cart from a folded state to an upright state;
locking the second side cart in the upright state thereby forming a second side assembly;
aligning the second side assembly with the grill assembly on the opposite side from the first side assembly; and
coupling the second side assembly to the grill assembly.

17. The method of assembling a grill system of claim 16, wherein the second side cart is locked in the upright state by coupling a second panel to the second side cart.

18. The method of assembling a grill system of claim 16, further comprising:
aligning a first top cap with the first side cart;
coupling the first top cap with the first side cart;
aligning a second top cap with the second side cart; and
coupling the second top cap with the second side cart;
wherein the first top cap comprises a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator;
wherein the second top cap comprises a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator.

19. The method of assembling a grill system of claim 18, wherein the functional element of the first top cap is not equivalent to the functional element of the second top cap.

20. A grill system, comprising:
a grill assembly comprising a grill cart and a burner box coupled to a top portion of the grill cart; and
a first side assembly comprising:
a first side cart comprising a front frame, a back frame opposite from the front frame, and a first shelf extending from the front frame to the back frame; and
a first panel;
wherein the first side cart is configured to be transitioned between a folded state and an upright state;
wherein the first shelf comprises a front half and a back half, the front half rotatably coupled to the back half and rotatably coupled to the front frame, and the back half rotatably coupled to the back frame, such that when the first side cart is in the folded state the front half and the back half are not located in the same plane and when the first side cart is in the upright state the front half and the back half are in the same plane;
wherein the grill assembly is coupled to the first side assembly;
wherein when the first panel is coupled to an outer side of the first side cart, the first side cart is locked in the upright state.

21. The grill system of claim 20, wherein the first side cart further comprises a first top cap, wherein the first top cap is coupled to a top portion of the first side cart, the first top cap comprising a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator; and
wherein the grill system further comprises: a second side assembly comprising a second side cart, a second top cap, and a second panel; wherein the second top cap is coupled to a top portion of the second side cart, wherein the second side cart is configured to be transitioned between a folded state and an upright state;
wherein the second side assembly is coupled to the grill assembly;
wherein when the second panel is coupled to an outer side of the second side cart the second side cart is locked in the upright state;
wherein the second top cap comprises a functional element selected from the group consisting of: a second burner box, an ice box, a smoker, an oven, a sink, a work surface, a warming drawer, a sous vide, a high heat burner, a ceramic cooker, a pellet grill, a portion of a pellet grill, a pellet feeder, a pellet hopper, or a refrigerator;

wherein the functional element of the first top cap is not equivalent to the functional element of the second top cap.

22. A grill system, comprising:

a grill assembly comprising a grill cart and a burner box coupled to a top portion of the grill cart;

a first side assembly comprising a first side cart and a first panel; wherein the first side cart is configured to be transitioned between a folded state and an upright state; and a second panel, wherein the second panel is coupled to the grill cart on an opposite side of the grill cart from the first side assembly;

wherein the grill assembly is coupled to the first side assembly;

wherein when the first panel is coupled to an outer side of the first side cart, the first side cart is locked into the upright state.

23. A grill system, comprising:

a grill assembly comprising a grill cart and a burner box coupled to a top portion of the grill cart;

a first side assembly comprising a first side cart and a first panel; wherein the first side cart is configured to be transitioned between a folded state and an upright state; and a second side assembly comprising a second side cart and a second panel, wherein the second side cart is configured to be transitioned between a folded state and an upright state;

wherein the grill assembly is coupled to the first side assembly;

wherein when the first panel is coupled to an outer side of the first side cart, the first side cart is locked into the upright state;

wherein the second side assembly is coupled to the grill assembly on an opposite side of the grill assembly from the first side assembly;

wherein when the second panel is coupled to an outer side of the second side cart, opposite from the grill assembly, the second side cart is locked in the upright state.

* * * * *